United States Patent [19]

Craport et al.

[11] Patent Number: 5,978,747
[45] Date of Patent: *Nov. 2, 1999

[54] METHOD FOR IDENTIFYING THE GEOGRAPHIC REGION OF A GEOGRAPHIC AREA WHICH CONTAINS A GEOGRAPHIC ZONE

[75] Inventors: William N. Craport, Norcross; Bruce C. Winters, Lawrenceville, both of Ga.

[73] Assignee: BellSouth Intellectual Property Corporation, Wilmington, Del.

[ * ] Notice: This patent is subject to a terminal disclaimer.

[21] Appl. No.: 09/063,417

[22] Filed: Apr. 20, 1998

Related U.S. Application Data

[63] Continuation of application No. 08/831,040, Apr. 1, 1997, Pat. No. 5,796,634.

[51] Int. Cl.[6] .................................................. G01B 7/00
[52] U.S. Cl. .......................... 702/150; 340/988; 340/995; 345/133; 345/418; 345/435; 455/422; 455/429; 701/208; 701/212
[58] Field of Search ............................ 702/150; 345/133, 345/418, 435, 438; 701/208, 212; 455/422, 429

[56] References Cited

U.S. PATENT DOCUMENTS

| | | | |
|---|---|---|---|
| 4,675,823 | 6/1987 | Noland | 701/300 |
| 4,809,201 | 2/1989 | Keklak | 345/435 |
| 5,445,524 | 8/1995 | Jones | 434/153 |
| 5,506,897 | 4/1996 | Moore et al. | 379/220 |
| 5,533,107 | 7/1996 | Irwin et al. | 379/201 |
| 5,550,743 | 8/1996 | Kyrtsos | 701/213 |
| 5,669,061 | 9/1997 | Schipper | 455/429 |
| 5,684,940 | 11/1997 | Freeman et al. | 345/438 |

*Primary Examiner*—John Barlow
*Assistant Examiner*—Hien Vo
*Attorney, Agent, or Firm*—Jones & Askew, LLP

[57] ABSTRACT

Identifying the geographic region of a geographic area which contains a geographic zone. To identify the geographic region which contains a geographic zone, one of the plurality of geographic regions in a geographic area is selected as a selected region. A determination is made as to whether the geographic zone is located within the selected region by determining whether the zone boundary points of the geographic zone are located within the selected region. If a predetermined percentage of the zone boundary points of the geographic zone are located within the selected region, then the geographic zone is located within the selected region and the geographic region is identified. To determine whether a zone boundary point is located within the selected region, a determination is made as to whether a line of predetermined slope drawn through the zone boundary point intersects the region boundary of the selected region. If the line intersects the selected region, then a determination is made as to whether the zone boundary point is located within the selected region.

22 Claims, 11 Drawing Sheets

METHOD FOR IDENTIFYING THE GEOGRAPHIC REGION OF A GEOGRAPHIC AREA WHICH CONTAINS A GEOGRAPHIC ZONE

This is a continuation under 37 C.F.R. §1.53(b), of prior application Ser. No. 08/831,040, entitled "System and Method For Identifying The Geographic Region of a Geographic Area which Contains A Geographic Zone Associated With A Location," filed on Apr. 1, 1997 on behalf of inventors William N. Craport and Bruce C. Winters, and assigned to BellSouth Corporation, which is incorporated herein by reference, now U.S. Pat. No. 5,796,634.

FIELD OF THE INVENTION

This invention relates in general to the field of geographic coding and in particular to a system and method for identifying the geographic region of a geographic area which contains a geographic zone associated with a location.

BACKGROUND OF THE INVENTION

A number of wireless devices have been developed to meet the needs of an increasingly mobile society. Devices such as telephones which were once hard-wired to a single location are now portable. Traditionally, when a customer requested telephone service, the customer was assigned a telephone number that was operable from a fixed location such as the customer's home or office. However, when a wireless customer requests service, the wireless customer is assigned a number which is operable over a large geographic area.

Wireless service is available virtually throughout the United States. The geographic area of the United States has been divided into geographic regions commonly referred to as Basic Trading Areas ("BTA's") by Rand McNally & Company. The Federal Communications Commission ("FCC") uses BTA's to define wireless coverage areas throughout the United States. The FCC issues a license for each BTA to permit a wireless service provider to operate within a specified frequency block within the BTA. A license permits a single service provider to operate within the BTA's frequency block and to serve wireless customers with billing addresses within the BTA. A single service provider may hold multiple licenses and may operate in multiple BTA's.

The wireless service provider for a particular BTA determines the calling features or services offered to customers within the BTA. Different service providers may offer different services and even the same service provider may offer different services in different BTA's. Not only may the services differ from BTA to BTA, but the tax rate for wireless service may differ from BTA to BTA.

To apply the proper tax rate to the customer's bill, the BTA which contains the customer's address must be identified. The BTA could be identified manually by a customer service representative or by a computer program using some type of lookup table or map. However, in either case there is room for error. If the address supplied by the customer is in error or is incorrectly recorded by the customer service representative, the correct BTA will not be identified. In addition to the possibility of human error, if the address is in a new development and is not yet included in the table or map, a BTA will not be identified. Thus, there is a need for a reliable method for identifying the BTA which contains a customer's address.

Once the correct BTA is identified, a BTA identifier may be included in the customer's file. The service provider may use the BTA identifiers to determine customers with billing addresses located in a selected BTA. If a service provider intends to offer additional calling features to customers in a selected BTA, those customers in the BTA can be targeted to receive information regarding the additional features.

In addition to relating a customer's billing address to a BTA, relating a customer's operating location to a BTA or other geographic region is also useful. When a customer reports a problem it is helpful to identify the BTA in which the customer was located when the problem occurred. If a customer reported that a calling feature was inoperable, it would be helpful to know whether the customer was in a BTA where the feature was offered when the problem occurred. It is also useful to relate a customer's operating location to a geographic region defined by the operating range of an antenna or other piece of equipment. By monitoring the locations of customer problems, a service provider may become aware of developing trends and may be able to take preventive action. For example, the occurrence of a number of problems in close proximity to an antenna or other piece of equipment may indicate an equipment problem.

To relate a customer's billing address or operating location to a BTA or other geographic region, the operating location and the geographic region may be geographically encoded or geocoded. To geocode an address or operating location, the address or description of the operating location is converted into longitude and latitude. A geocoder is a program module which converts a location description into longitude and latitude. An example of a geocoder is P.A.C.E. (Probabalistic Address Coding Engine) from Matchware Technologies, Inc., 15212 Dino Drive, Burtonsville, Md. 20866.

Longitude and latitude for a location may be obtained for a street address using a geocoder such as P.A.C.E. However, there may be times when a street address is unavailable. For example, at activation, a customer may provide a street address which cannot be resolved into longitude and latitude because the address is in a new development. In this case, the customer's location may be estimated by the geographic zone defined by the customer's zip code. Since it is preferable to store longitude and latitude for a single point, the longitude and latitude for the centroid of the customer's zip code zone may be stored. Another example is where a customer reports a problem but cannot identify a street address where the problem occurred. If the customer could identify a neighborhood, the longitude and latitude for the centroid of the neighborhood zone could be used.

To geocode a region, the region boundary points of the region are converted into a plurality of longitudinal and latitudinal coordinates. Similarly, to geocode a zone, the zone boundary points of the zone are converted into a plurality of longitudinal and latitudinal coordinates. Libraries of geocoded data are available which contain longitude and latitude for geographic regions such as BTA's and for geographic zones such as zip code zones. Examples of geocoded data libraries include Dynamap/2000 Street Network File from Geographic Data Technologies, 11 Lafayette Street, Labanon, N.H. 03766 and BTA/MTA Boundaries U.S. from MapInfo Corp., One Global View, Troy, N.Y. 12180. Once a location and a region are described by longitude and latitude, a comparison may be made between the longitude and latitude for the location, and the longitude and latitude for the region to determine whether the location is located within the geographic region.

If the identification of the geographic region which contains the location is made in real time, the identification is more useful. In the account activation example, if the location information provided by the customer is resolved into longitude and latitude for a zip code zone within the geographic area, but the longitude and latitude do not identify a BTA served by the wireless service provider, then there is probably an error in the zip code. If the identification of the BTA which contains the location can be made while the customer is still available, then the customer can immediately correct or supplement the location information. In the case of problem reporting, if the BTA or other geographic region which contains the problem location can be determined quickly, the problem is more likely to be resolved during the initial problem report, eliminating the need for a subsequent customer call-back. Real time determination also provides valuable information for system analysis and resource allocation.

Accordingly, in the field of geographic coding, there is a need for a system and method for identifying the geographic region of a geographic area which contains a geographic zone.

There is an additional need for a system and method for identifying the geographic region of a geographic area which contains a geographic zone in real time.

SUMMARY OF THE INVENTION

The present invention provides a system and method for identifying the geographic region of a geographic area which contains a geographic zone associated with a location. To implement this system and method, longitude and latitude for a geographic zone associated with a location are obtained. A geographic zone, such as a zip code zone, may be associated with a location if the geographic zone approximates the location. Longitude and latitude for the zone boundary points define a geographic zone and are used to identify the geographic region of a geographic area which contains a geographic zone associated with the location.

The geographic area is divided into a plurality of non-overlapping geographic regions. To identify the geographic region which contains a geographic zone, generally one of the geographic regions is selected as a selected region. A determination is made as to whether the geographic zone is located within the selected region. If the determination is that the geographic zone is located within the selected region, then the selected region is identified.

Advantageously, the present invention provides a system and method for the identification of the geographic region which contains a geographic zone in real time. Such an identification in real time is very useful. In systems using geographic coding, real time identification of the geographic region which contains a geographic zone provides valuable information for system analysis and resource allocation. Real time determination also provides early detection of errors in geographic zone information. The failure to identify a geographic region that contains a geographic zone when the geographic zone is located within that geographic area indicates that the geographic zone information is erroneous. If the error can be detected in real time, it is easier to obtain corrected or supplemental information.

The present invention provides several preferred methods for identifying the geographic region of a geographic area which contains a geographic zone. The preferred methods may be divided into two groups. One group of preferred methods uses estimated geographic regions to identify the geographic region of a geographic area which contains a geographic zone. The other group of preferred methods does not use estimated geographic regions. An estimated geographic region approximates or estimates the general size of a geographic region by a regular-shaped estimated geographic region. A description of the group of preferred methods which does not use estimated geographic regions is presented first.

Boundary Point Pair Method

With respect to the group of preferred methods which does not use estimated regions, one of the preferred methods begins by dividing the geographic area into a plurality of non-overlapping geographic regions. One of the plurality of zone boundary points is selected as a selected zone boundary point and one of the plurality of non-overlapping geographic regions is selected as a selected region. A first determination is made as to whether the selected zone boundary point is located within the selected region. The determination is made by drawing a line of predetermined slope through the selected zone boundary point and through the selected region so that the line intersects the boundary of the selected region at a first boundary point and at a second boundary point. The first determination also includes checking whether the selected zone boundary point lies on the line between the first boundary point and the second boundary point. If the selected zone boundary point lies on the line between the first boundary point and the second boundary point, then the first determination is that the selected zone boundary point is located within the selected region.

If the first determination is that the selected zone boundary point is located within the selected region, then another one of the zone boundary points is selected as a selected zone boundary point and the step of making a first determination as to whether the selected zone boundary point is located within the selected region is repeated. If at least a predetermined percentage of the zone boundary points is located within the selected region, then the selected region is identified. If each geographic region has a name, then preferably, the step of identifying the selected region includes identifying the selected region by the name of the selected region.

If the selected zone boundary point does not lie on the line between the first boundary point and the second boundary point, then preferably the first determination is that the selected zone boundary point is not located within the selected region. If the selected zone boundary point is not located within the selected region, then preferably another one of the geographic regions is selected as the selected region and another first determination is made as to whether the selected zone boundary point is located within that selected region. These steps are repeated until the first determination is that the selected zone boundary point is located within the selected region.

Single Boundary Point Method

In another one of the preferred methods to identify the geographic region which contains a geographic zone, the geographic area is divided into a plurality of non-overlapping geographic regions. One of the plurality of zone boundary points is selected as a selected zone boundary point and one of the plurality of non-overlapping geographic regions is selected as a selected region. A first determination is made as to whether the selected zone boundary point is located within the selected region. The first determination is made by drawing a line of predetermined slope through the selected zone boundary point and through the selected region. If the line intersects the boundary of the selected region at the selected zone boundary point, then the first determination is that the selected zone boundary point is located within the selected region. If the first determination is that the selected zone boundary point is located within the selected region, then another zone boundary point is selected as a selected zone boundary point and a second determination is made as to whether the selected zone boundary point is located within the selected region.

If at least a predetermined percentage of the plurality of zone boundary points is located within the selected region, the selected region is identified. If each geographic region has a name, then the step of identifying the selected region preferably includes identifying the selected region by the name of the selected region.

In the Single Boundary Point Method, the line may intersect the boundary of the selected region only at the selected zone boundary point. If the line intersects only at the selected zone boundary point, then preferably the determination is that the selected zone boundary point is located within the selected region.

Preferably, the step of making a second determination as to whether the selected zone boundary point is located within the selected region includes drawing a line of predetermined slope through the selected zone boundary point and through the selected region so that the line intersects the boundary of the selected region at a first boundary point and at a second boundary point. The second determination also includes checking whether the selected zone boundary point lies on the line between the first boundary point and the second boundary point. If the selected zone boundary point lies on the line between the first boundary point and the second boundary point, then the second determination is that the selected zone boundary point is located within the selected region.

Alternatively, the step of making a second determination as to whether the selected zone boundary point is located within the selected region includes drawing a line of predetermined slope through the selected zone boundary point and through the selected region. If the line intersects the boundary of the selected region at the selected zone boundary point, then the second determination is that the selected zone boundary point is located within the selected region.

If the line of predetermined slope does not intersect the selected region at the selected zone boundary point, then the first determination is defined to be that the selected zone boundary point is not located within the selected region. If the first determination is that the selected zone boundary point is not located within the selected region, then preferably, another one of the geographic regions is selected as the selected region and another first determination is made as to whether the selected zone boundary point is located within that selected region. These steps are repeated until the first determination is that the selected zone boundary point is located within the selected region.

Preferred Methods Using Estimated Geographic Regions

In another group of preferred methods to identify the geographic region which contains a geographic zone, estimated geographic regions and an estimated zone are used. An estimated geographic region corresponds to a geographic region and generally approximates or estimates the geographic region with a regular-shaped estimated geographic region which totally encompasses the corresponding geographic region. Similarly, an estimated geographic zone generally approximates or estimates the geographic zone with a regular-shaped estimated zone which totally encompasses the corresponding geographic zone. This group of preferred methods is similar to the group of preferred methods described above, except that an additional determination is made as to whether the estimated zone is located within a selected estimated region.

Boundary Point Pair Method Using Estimated Geographic Regions

In one of the preferred methods to identify the geographic region which contains a geographic zone using estimated geographic regions, the geographic zone is estimated with an estimated zone. One of the geographic regions is selected as the selected region and the selected region is estimated with a selected estimated region. A first determination is made as to whether the estimated zone is located within the selected estimated region. If the first determination is that the estimated zone is located within the selected estimated region, then one of the zone boundary points is selected as a selected zone boundary point.

Once the selected zone boundary point is selected, a second determination is made as to whether the selected zone boundary point is located within the selected region. The second determination is made by drawing a line of predetermined slope through the selected zone boundary point and through the selected region so that the line intersects the boundary of the selected region at a first boundary point and at a second boundary point. The second determination includes checking whether the selected zone boundary point lies on the line between the first boundary point and the second boundary point. If the selected zone boundary point lies on the line between the first boundary point and the second boundary point, then the second determination is that the selected zone boundary point is located within the selected region.

If the second determination is that the selected zone boundary point is located within the selected region, then another one of the zone boundary points is selected as a selected zone boundary point and the step of making a second determination is repeated. If at least a predetermined percentage of the zone boundary points is located within the selected region, then the selected region is identified. If each geographic region has a name, then the step of identifying the selected region preferably includes identifying the selected region by the name of the selected region.

If the first determination is that the estimated zone is not located within the selected estimated region, then preferably, the step of selecting one of the geographic regions as a selected region, the step of estimating the selected region with a selected estimated region, and the step of making a first determination as to whether the estimated zone is located within the selected estimated region are repeated. These steps are repeated until the first determination is that the estimated zone is located within the estimated region.

If the second determination is that the selected zone boundary point is not located within the selected region, then preferably, the step of selecting one of the geographic regions as a selected region, the step of estimating the selected region with a selected estimated region, the step of making a first determination as to whether the estimated zone is located within the selected estimated region and the step of making a second determination are repeated. These steps are repeated until the second determination is that the selected zone boundary point is located within the selected region.

In Boundary Point Pair Method Using Estimated Geographic Regions just described, the selected region is preferably estimated with a selected estimated region which totally encompasses the selected region. Similarly, the geographic zone is preferably estimated with an estimated zone which totally encompass the geographic zone.

Single Boundary Point Method Using Estimated Geographic Regions

Another of the preferred methods to identify the geographic region which contains a geographic zone uses estimated geographic regions. Per this method, the geographic zone is estimated by an estimated zone. One of the plurality of geographic regions is selected as the selected region and the selected region is estimated by a selected estimated region. A first determination is made as to whether the estimated zone is located within the selected estimated region. If the first determination is that the estimated zone is located within the selected estimated region, then one of the zone boundary points is selected as a selected zone boundary point.

A second determination is made as to whether the selected zone boundary point is located within the selected region. The second determination is made by drawing a line of predetermined slope through the selected zone boundary point and through the selected region. If the line intersects the boundary of the selected region at the selected zone boundary point, then the second determination is that the selected zone boundary point is located within the selected region.

If the second determination is that the selected zone boundary point is located within the selected region, then another one of the zone boundary points is selected as a selected zone boundary point and a third determination is made as to whether the selected zone boundary point is located within the selected region. If at least a predetermined percentage of the zone boundary points is located within the selected region, then the selected region is identified. If each geographic region has a name, then the step of identifying the selected region preferably includes identifying the selected region by the name of the selected region.

In this method, the line may intersect the boundary of the selected region only at the selected zone boundary point. If the line intersects the boundary of the selected region only at the selected zone boundary point, then preferably the second determination is that the selected zone boundary point is located within the selected region.

If the first determination is that the estimated zone is not located within the selected estimated region, then preferably the step of selecting one of the geographic regions as a selected region, the step of estimating the selected region with a selected estimated region, and the step of making a first determination as to whether the estimated zone is located within the selected estimated region are repeated. These steps are repeated until the first determination is that the estimated zone is located within the selected region.

If the second determination is that the selected zone boundary point is not located within the selected region, then preferably the step of selecting one of the geographic regions as a selected region, the step of estimating the selected region with a selected estimated region, the step of making a second determination as to whether the estimated zone is located within the selected estimated region and the step of making a second determination are repeated. These steps are repeated until the second determination is that the selected zone boundary point is located within the selected region.

Preferably, the step of making a third determination as to whether the selected zone boundary point is located within the selected region includes drawing a line of predetermined slope through the selected zone boundary point and through the selected region so that the line intersects the boundary of the selected region at a first boundary point and at a second boundary point. The third determination includes checking whether the selected zone boundary point lies on the line between the first boundary point and the second boundary point. If the selected zone boundary point lies on the line between the first boundary point and the second boundary point, then the third determination is that the selected zone boundary point is located within the selected region.

Alternatively, the step of making a third determination as to whether the selected zone boundary point is located within the selected region includes drawing a line of predetermined slope through the selected zone boundary point and through the selected region. If the line intersects the boundary of the selected region at the selected zone boundary point, then the third determination is that the selected zone boundary point is located within the selected region.

In this preferred method, the selected estimated geographic region preferably totally encompasses the selected region. Likewise, the estimated zone totally encompasses the geographic zone.

System for Identifying the Geographic Region Which Contains a Geographic Zone

The preferred system for identifying the geographic region which contains a geographic zone utilizes a computer-readable medium which stores a computer program. The computer program includes instructions for selecting one of the zone boundary points as a selected zone boundary point and selecting one of the non-overlapping geographic regions as a selected region. A determination is made as to whether the selected zone boundary point is located within the selected region. The determination is made by drawing a line of predetermined slope through the selected zone boundary point and through the selected region so that the line intersects the region boundary of the selected region at a first boundary point and at a second boundary point. The determination also includes checking whether the selected zone boundary point lies on the line between the first boundary point and the second boundary point. If the selected zone boundary point lies on the line between the first boundary point and the second boundary point, then the determination is that the selected zone boundary point is located within the selected region. If the selected zone boundary point does not lie on the line between the first boundary point and the second boundary point, then the determination is that the selected zone boundary point is not located within the selected region.

If the determination is that the selected zone boundary point is located within the selected region, then preferably the step of making a determination as to whether the selected zone boundary point is located within the selected region is repeated with another one of the zone boundary points as the selected zone boundary point. If at least a predetermined percentage of the zone boundary points is located within the selected region, then the computer program identifies the selected region. If each geographic region has a name, then the step of identifying the selected region may include identifying the selected region by the name of the selected region.

If the determination is that the selected zone boundary point is not located within the selected region, then the step of selecting another one of the geographic regions as a selected region and the step of making a determination as to whether the selected zone boundary point is located within the selected region are repeated. These steps are repeated until the determination is that the selected zone boundary point is located within the selected region.

Accordingly, it is an object of the present invention to provide a system and method for identifying the geographic region of a geographic area which contains a geographic zone.

It is an additional object of the present invention to provide a system and method for identifying the geographic region which contains a geographic zone in real time.

DETAILED DESCRIPTION

Figure 1:
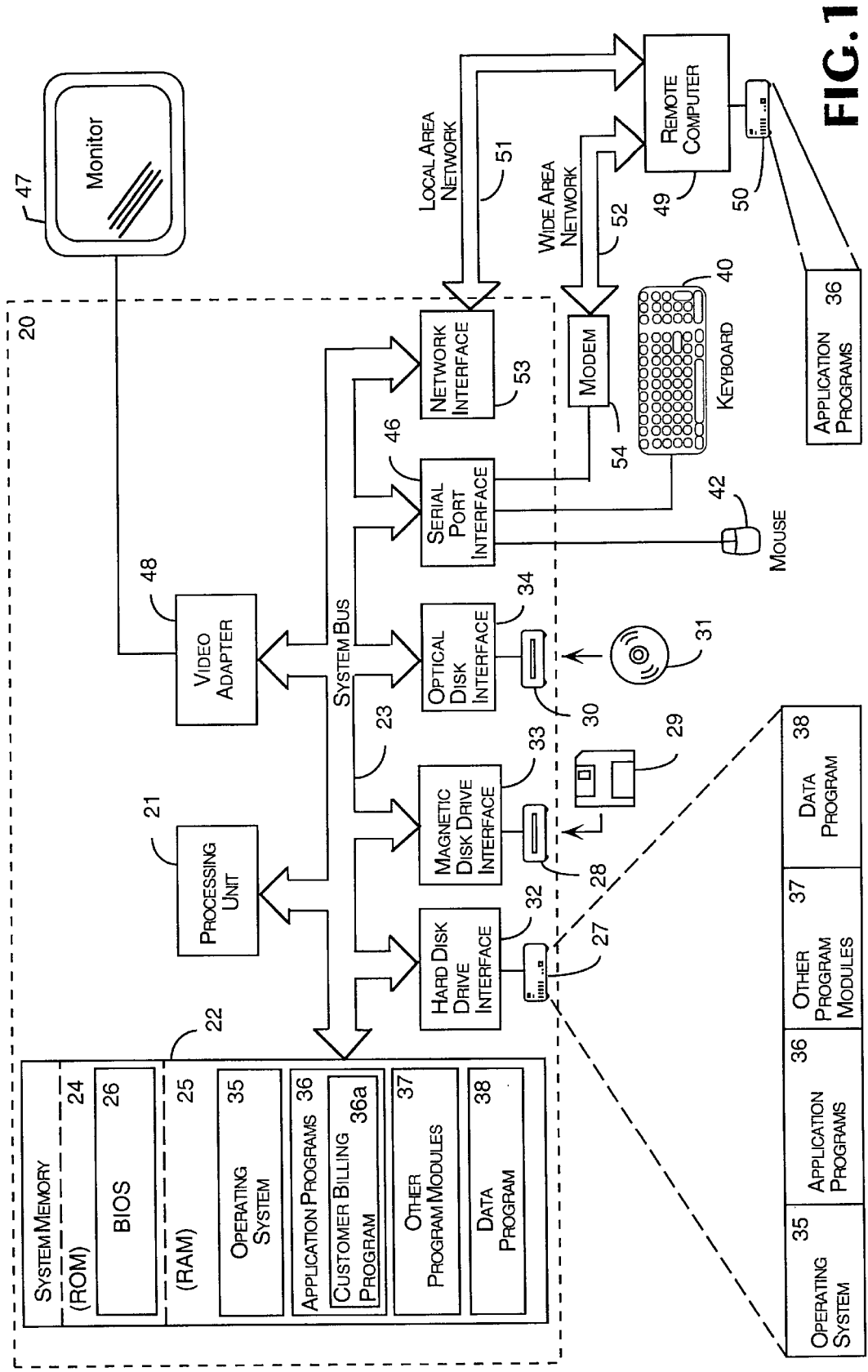
FIG. 1 is a block diagram of a personal computer that provides an exemplary operating environment for the preferred embodiments of the present invention.

The present invention is directed to a system and method for identifying the geographic region of a geographic area which contains a geographic zone associated with a location. The particular embodiments described herein are intended in all respects to be illustrative rather than restrictive. Alternative embodiments will become apparent to those skilled in the art to which the present invention pertains without departing from its spirit and scope.

Preferably, the present invention is implemented with a computer system. The figures included herein may appear (completely or in part) on a computer screen as part of a graphical user interface ("GUI") for interaction with a user. However, the preferred methods described herein do not require that any of the figures appear to the user. Nonetheless, the figures and accompanying detailed description provide an explanation of the steps of the preferred methods of the present invention. These steps may be carried out by the computer system through operations and programming that will be wellknown to those skilled in the art.

Application of Invention by Wireless Service Provider

A representative application of the present invention is its use by a wireless service provider in the areas of customer billing and customer service trouble tracking. In the area of customer billing, the present invention may be used by a wireless service provider to identify the BTA which contains a customer's address. When a customer activates a wireless device, the customer provides the service provider with a street address for the delivery of the customer's bills. The zip code of the customer's street address may be geocoded to obtain a zip code zone and the present invention may be used to identify the BTA which contains the zip code zone. The BTA which contains the customer's zip code zone may be identified by a BTA name or BTA number. Once the BTA that contains the customer's zip code zone is identified, a BTA identifier may be placed in the customer's account file so that any BTA specific charges or rates such as taxes will be properly reflected in the customer's account. In the customer billing application, a map or other graphical representation of the geographic area, geographic regions or the geographic zone may not be displayed to the customer service representative.

In the area of customer service trouble tracking, a wireless service provider may geocode a location where a problem occurred. Geocoding problems helps a service provider focus on problem activity within a particular area. Once a customer provides the service provider with the location where a problem occurred, the location may be geocoded and may be displayed on a map of the area. By monitoring the locations of customer problems, a service provider may become aware of developing trends and may be able to take preventive action. For example, the occurrence of a number of problems in close proximity to an antenna or other piece of equipment may indicate an equipment problem.

Exemplary Computer Operating Environment

The present invention can be implemented as a sequence of computer-executed steps. FIG. 1 illustrates various aspects of the preferred computing environment in which the present invention is designed to operate. FIG. 1 and the following discussion are intended to provide a brief, general description of a suitable computing environment in which the present invention may be implemented. While the present invention will be described in the general context of a distributed computing environment, those skilled in the art will recognize that the invention also may be implemented in other environments. In a distributed computing environment, tasks are performed by remote processing devices that are linked through a communications network. Program modules may be located in both local and remote memory storage devices. Generally, program modules include routines, programs, components, data structures, etc. that perform particular tasks or implement particular abstract data types. The invention may also be practiced in the context of an application program that runs on an operating system in conjunction with a personal computer or in combination with other program modules. Moreover, those skilled in the art will appreciate that the invention may be practiced with other computer system configurations, including hand-held devices, multiprocessor systems, microprocessor-based or programmable consumer electronics, minicomputers, mainframe computers, and the like.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, such as a customer billing program 36a, other program modules 37, and program data 38. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

All the preferred methods of the present invention may be implemented with a computer system which utilizes a computer-readable medium. A computer readable medium may store a computer program which performs the steps of any of the preferred methods as a sequence of computer-executable steps.

Exemplary System Environment

Figure 2:
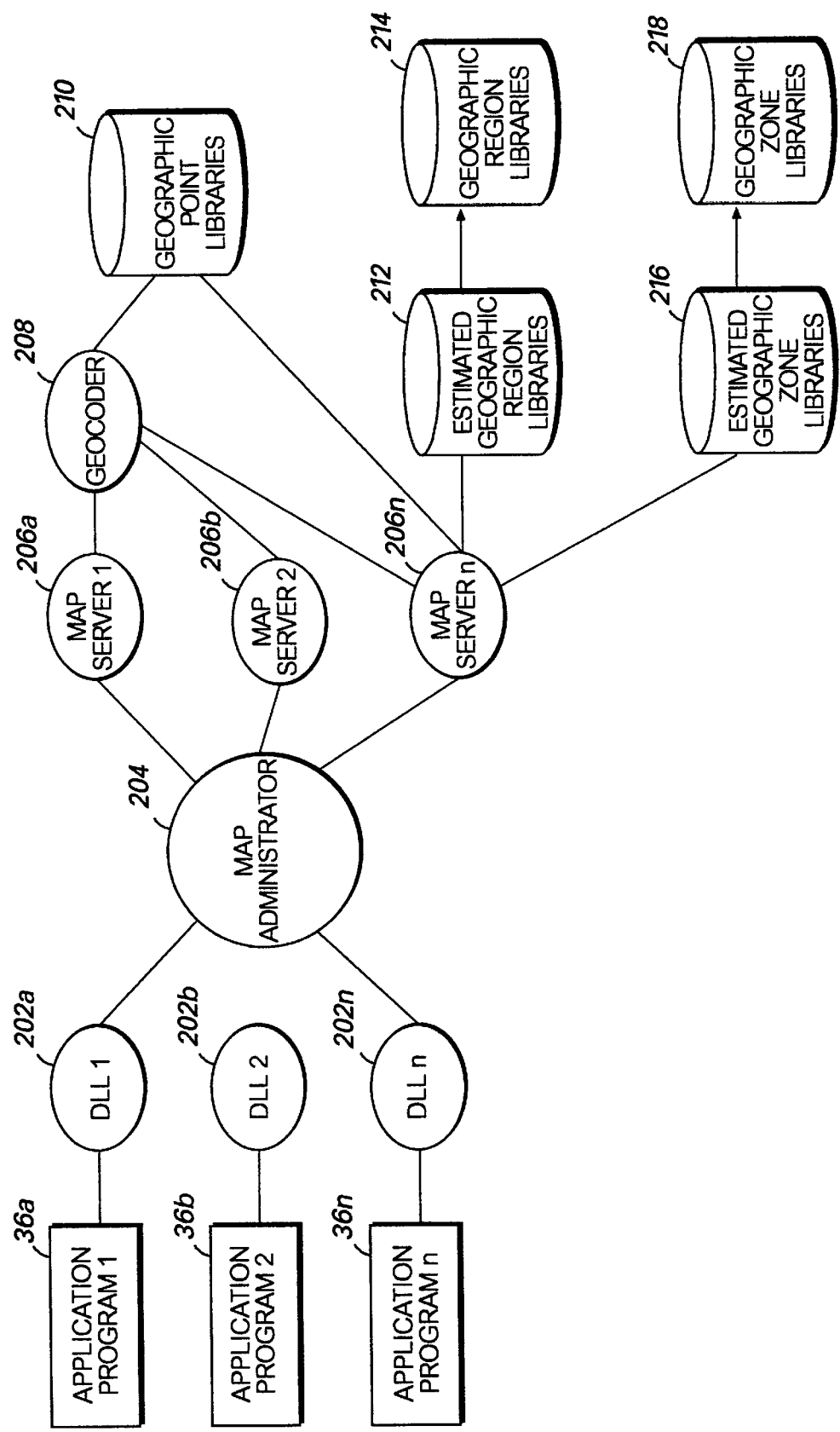
FIG. 2 is a block diagram of an exemplary distributed computing environment as may be used in connection with the preferred embodiments of the present invention.

The present invention provides a method for identifying the geographic region which contains a geographic zone associated with a location. The geographic coordinates for the geographic zone are used to identify the geographic region which contains the geographic zone. The preferred methods for identifying the geographic region may be implemented in a distributed computing environment. An exemplary distributed computing system for use in connection with the preferred methods is illustrated by FIG. 2. A number of application programs 36a–36n are shown in FIG. 2. The application programs 36a–36n may be located in a single personal computer 20 or may be located in different computers. Representative applications include customer billing applications and customer service trouble tracking applications.

Preferably, the distributed computing system includes a map administrator 204. A map administrator is a program module which provides a queuing mechanism to service simultaneous requests from the applications 36a–36n and a routing mechanism to route a request from an application 36a–36n to a map server 206a–206n. The map administrator may be located in a remote computer system 49 or in the same system as an application 36a–36n. In FIG. 2, the applications 36a–36n are shown connected to a map administrator 204 via dynamic link libraries 202a–202n. A dynamic link library is generally a program module which can be loaded prior to execution and then unloaded after execution. Other possible ways of connecting or interfacing an application 36a–36n to the map administrator 204 will be apparent to those skilled in the art.

FIG. 2 also shows a number of map servers 206a–206n. The map servers 206a–206n are also program modules. The map servers 206a–206n may be located in a remote computer system. The map servers 206a–206n may provide additional geocoding functions beyond those available in the geocoder 208. The map servers 206a–206n also provide a program module for determining the geographic region which contains a geographic zone. The geocoder 208 is a program module which converts an address or an intersection into longitude and latitude. Although FIG. 2 only shows one geocoder, additional geocoders may be added to the system. In the preferred embodiment, the geocoder is a geocoder such as the P.A.C.E. geocoder marketed by Matchware Technologies. Alternatively, the geocoder could perform the functions supplied by the P.A.C.E. geocoder, as well as the additional functions supplied by the map servers.

The geocoder 208 and the map servers 206a–206n have access to geographic point libraries 210. The geographic point libraries contain longitude and latitude for a number of geographic points, including addresses, intersections, landmarks, and zip code centroids. Although FIG. 2 only shows one map server 206n connected to the geographic point libraries 210, each map server 206a–206n may be connected to the geographic point libraries 210.

In addition to the geographic point libraries 210, the map servers also have access to geographic region libraries 214 and estimated geographic region libraries 212. The geographic region libraries 214 contain longitude and latitude for the boundary points for a number of geographic regions such as BTA's. The estimated geographic region libraries 212 contain longitude and latitude for the boundary points for a number of estimated geographic regions. In the preferred embodiment, the estimated geographic region libraries contain an entry for each estimated geographic region. Each entry includes two longitudinal coordinates and two latitudinal coordinates for the estimated geographic regions, a region identifier, a region name and a pointer to a file in the geographic region library corresponding to a geographic region.

In addition to the geographic region libraries 214 and the estimated geographic region libraries 212, the map servers also have access to geographic zone libraries 218 and estimated geographic zone libraries 216. The geographic zone libraries 216 contain longitude and latitude for the boundary points for a number of geographic zones such as zip code zones. The estimated geographic zone libraries 216 contain longitude and latitude for the boundary points for a number of estimated geographic zones. In the preferred embodiment, the estimated geographic zone libraries contain an entry for each estimated geographic zone. Each entry includes two longitudinal coordinates and two latitudinal coordinates for the estimated geogeoraphic zones and a pointer to a file in the geographic zone library corresponding to a geographic zone. The geographic libraries 210, 212, 214, 216 and 218 may be stored on a hard disk drive 27, an optical disk drive 31, or on another type of storage media.

The Geographic Environment

Longitude and latitude preferably provide a geographic coordinate system for use in connection with the present invention. Other coordinate systems such as an x-y coordinate system may be used with the present invention with appropriate adjustments. A geographic point is a point within the geographic coordinate system and is preferably described by geographic coordinates such as longitude and latitude. A geographic point may be associated with a location. A geographic point is associated with a location if the longitude and latitude for the location are the same as the longitude and latitude for the geographic point. Even if the longitude and latitude for the geographic point are not the same as the longitude and latitude for the location, the geographic point may still be associated with the location. If the longitude and latitude for the geographic point approximate the longitude and latitude for the location, then the geographic point is associated with the location.

For example, a location may be described by an address. The address may be geocoded to identify the longitude and latitude for the address. The longitude and latitude for the address define a geographic point. In this case, the longitude and latitude for the location are the same as the longitude and latitude for the geographic point, so the geographic point is associated with the location. In another example, a location may be described by a zip code. A zip code is defined by a zone boundary including a plurality of zone boundary points. Each zone boundary point is a geographic point and may be described by longitude and latitude. In this case, the longitude and latitude for the zone boundary points are not the same as the longitude and latitude for the location. However, the longitude and latitude for the zone boundary points approximate the longitude and latitude for the location, so the geographic zone is associated with the location.

In addition to defining a geographic point and a geographic zone, longitude and latitude may be used to define a geographic region. A geographic region is defined by a region boundary including a plurality of region boundary points. Each region boundary point is a geographic point and may be described by longitude and latitude. Once the zone boundary points for a geographic zone associated with the location are described by longitude and latitude and the region boundary points of the geographic regions in a geographic area are described by longitude and latitude, the geographic region which contains the geographic zone may be identified.

Figure 3:
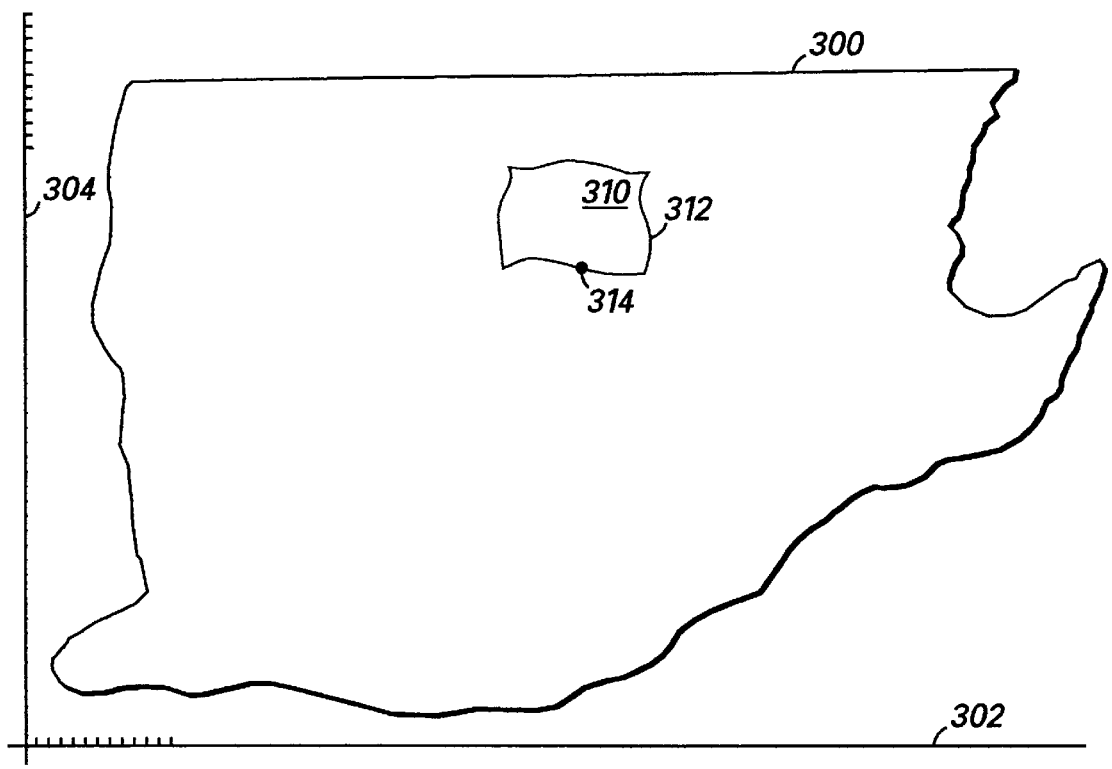
FIG. 3 illustrates an exemplary geographic area and a geographic zone as may be used in connection with the preferred embodiments.

An exemplary geographic area 300 and a geographic zone 310 located within the geographic area are shown in FIG. 3. As an example, the geographic zone could be a zip code zone within the geographic area. The geographic zone is defined by a zone boundary 312, including a plurality of zone boundary points. Each zone boundary point is a geographic point and preferably is described by longitude and latitude. One of the plurality of zone boundary points is illustrated in FIG. 3 as zone boundary point 314.

Figure 4:
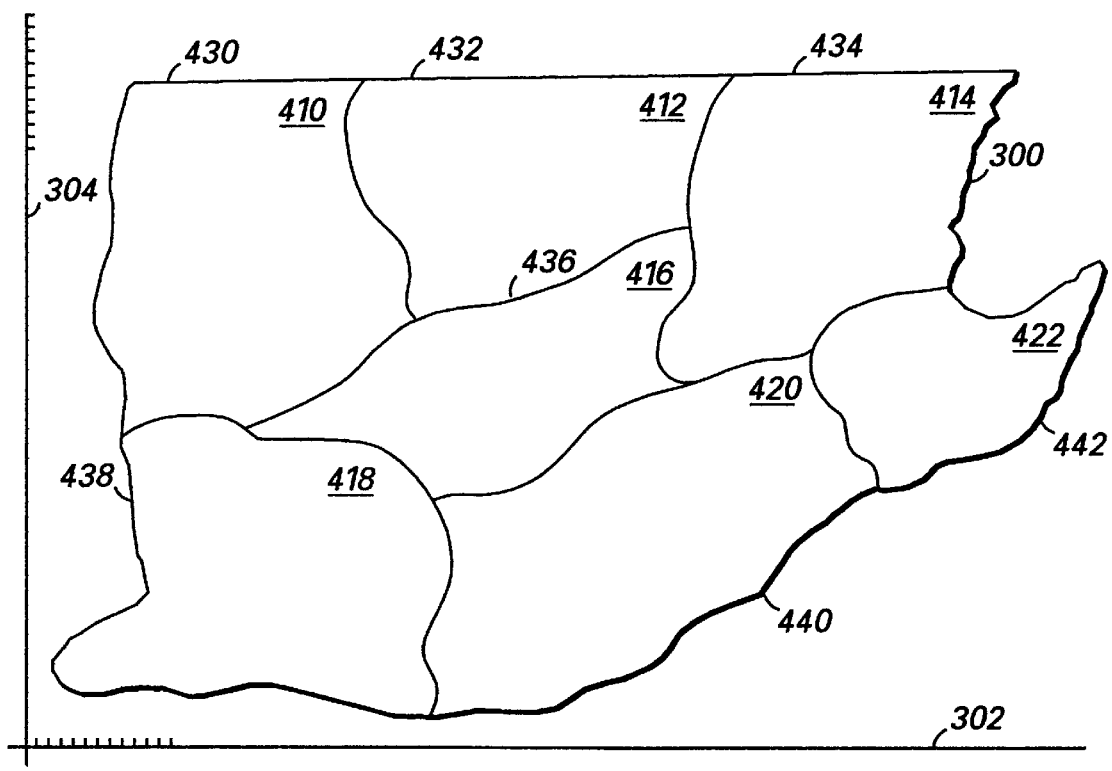
FIG. 4 illustrates the geographic area of FIG. 3 divided into geographic regions.

FIG. 4 illustrates the geographic area 300 divided into a plurality of non-overlapping geographic regions 410, 412, 414, 416, 418, 420, and 422. A geographic region may be of any size or shape and may be irregularly shaped. There may be any number of geographic regions in a geographic area. Each geographic region is defined by a region boundary 430, 432, 434, 436, 438, 440, and 442, including a plurality of region boundary points. Each region boundary point is a geographic point and is preferably described by longitude and latitude. As an example, a geographic area could be divided into geographic regions representing BTA's whose size and shape are defined by the FCC.

Identifying Geographic Coordinates for a Geographic Zone Associated with a Location To identify geographic coordinates for a geographic zone associated with a location, a description of the location is needed. The location may be described by an address, including a zip code. The description of the location is geocoded to convert the description into longitude and latitude. The system shown in FIG. 2 may be used to geocode a description of a location. An application program 36a–36n, for example customer billing application program 36a, requests longitude and latitude for a location described by an address. Preferably, the address is a street address including a street number, a street name, a city, a state and a zip code. The map administrator 204 determines which map server 206a–206n is available and routes the request, including the address, to the available map server 206a–206n, for example, map server 206a. The map server 206a receives the address and sends the address to the geocoder 208. The geocoder 208 receives the address and preferably determines whether there is an address match candidate for the address. An address match candidate is an address which the geocoder 208 determines is a likely match for the address received from the application. The address match candidate may be described by an address, but may also be described by longitude and latitude because the address match candidate is also a geographic point.

If there is an address match candidate for the address, then the address match candidate is returned to the application 36a via the map server 206a. The application 36a makes an address determination as to whether the address match candidate is associated with the location. The address determination may be made by comparing the components of the address describing the location with the components of the address match candidate. For example, comparing the street number, the street name, the city and the state. The comparison may be made by the application program or may be made by a customer service representative comparing the address and the address match candidate. Preferably, if all of the components of the address of the address match candidate match all the components of the address describing the location, then the address determination is that the address match candidate is associated with the location. The results of the address determination are communicated to the map server 206a. If the address determination is that the address match candidate is associated with the address, then the map server 206a requests that the geocoder 208 provide longitude and latitude for the address match candidate. Once the geocoder 208 provides the longitude and latitude for the address match candidate to the map server, the map server 206a sends the longitude and latitude to the application 36a. In this manner, the geographic coordinates for a geographic point associated with the location are identified.

The preferred method may be illustrated by an example in which an application requests geographic coordinates for a location described by an address of 1125 North Main Street, Atlanta, Ga. 30303. The map administrator receives the address from the application and determines which map server is available to handle the request. Once an available map server is identified, the map administrator sends the address to the map server. The map server receives the address and forwards the address to the geocoder. The geocoder receives the address and determines an address match candidate for the address. In this example, the address match candidate is 1125 North Main Street, Atlanta, Ga. The map server receives the address match candidate from the geocoder and returns the address match candidate, 1125 North Main Street, Atlanta, Ga., to the application.

Once the application receives the address match candidate, the application compares the address match candidate to the location. In this example, the location was described by an address so the address for the location is compared to the address for the address match candidate. Since the address and the address match candidate are identical, the address determination is that the address match candidate is associated with the address. The result of the address determination is communicated to the map server. In response to the address determination, the map server obtains the geographic coordinates for the address match candidate from the geocoder and returns the geographic coordinates to the application.

The address for the address match candidate and the address describing the location may not always be identical. For example, an address of 1125 North Main Street, Atlanta, Ga. is provided by the application, but the geocoder may identify address match candidates of (1) 125 North Main Street, Atlanta, Ga. and (2) 1125 South Main Street, Atlanta, Ga. The geocoder sends address match candidate number one to the map server and the map server sends address match candidate number one to the application. The application makes an address determination by comparing the address for address match candidate number one with the address for the location. Since the addresses are not identical, the application may need to do more than just compare the elements of the addresses. The application may attempt to verify that the address, 1125 N. Main Street, Atlanta, Ga., sent to the map server is correct. If the application determines that the address sent to the map server is incorrect, and that the correct address is actually 125 N. Main Street, Atlanta, Ga., then the address determination is that address match candidate number one is associated with the location. In a customer billing application, the street number may have been incorrectly entered by a customer service representative or the customer may have supplied an incorrect street number.

As the example in the immediately preceding paragraph illustrates, the geocoder may return more than one address match candidate. If the geocoder returns more than one address match candidate, then preferably the application repeats the step of making an address determination as to whether the address match candidate is associated with the location until the address determination is that the address match candidate is associated with the location or until all the address match candidates received from the map server are reviewed.

There may be times when the geocoder does not return any address match candidates. If the geocoder does not return any address match candidates, then the map server makes an address match candidate determination that there is no address match candidate associated with the address. If the geocoder returns an address match candidate, then the map server makes an address match candidate determination that there is an address match candidate associated with the address.

Preferably, if the address match candidate determination is that there is no address match candidate associated with the address, then the map server deletes the street number from the address to create a modified address and sends the modified address to the geocoder. The geocoder determines a modified address match candidate based upon the modified address. The map server receives the modified address match candidate and sends the modified address match candidate to the application. The application then makes a modified address determination as to whether the modified address match candidate is associated with the location. In this case, the modified address is described by an address and the location is also described by an address. The application may compare the components of the address for the modified address match candidate with the components of the address for the location to determine whether the modified address match candidate is associated with the location. If the modified address match candidate is associated with the location, then the longitude and latitude for the address match candidate are identified.

If neither the address match candidates nor the modified address match candidates are associated with the location, then the map server identifies geographic coordinates for a geographic point associated with the zip code of the location. Preferably, geographic coordinates for the geographic point associated with the centroid of the zip code zone are identified. The geographic point associated with the centroid of the zip code zone corresponds to an entry in the estimated geographic zone library and an entry in the geographic zone library. The geographic coordinates for the estimated geographic zone and the geographic zone stored in the estimated geographic zone library and the geographic zone library, respectively, may be used to identify the geographic region which contains the geographic zone.

Preferred Methods for Identifying the Geographic Region Which Contains a Geographic Zone The present invention provides several preferred methods for identifying the geographic region which contains a geographic zone. Preferably, the geographic zone is described by a plurality of zone boundary points which are described by longitude and latitude. The preferred methods may be divided into two groups. One group of preferred methods uses estimated geographic regions. The other group of preferred methods does not use estimated geographic regions. A description of the group of preferred methods which does not use estimated geographic regions is presented first.

Basic Method

All the preferred methods for identifying the geographic region which contains a geographic zone share a common overall method. The overall method described herein is referred to as the Basic Method for ease of reference. The first step of the Basic Method is to select one of the plurality of non-overlapping geographic regions as a selected region. The selection of the selected region may be arbitrary or may be based on some type of hierarchy. For example, the geographic region last identified as containing a geographic zone or most often identified as containing a geographic zone may be selected. Once a geographic region is selected as the selected region, a determination is made as to whether the geographic zone is located within the selected region. The determination as to whether the geographic zone is located within the selected region is made by checking whether the zone boundary points are located within the selected region. The preferred methods within a group correspond to different methods for making a determination as to whether a selected zone boundary point is located within the selected region. Different preferred methods may be used for different selected zone boundary points. If the determination is that the geographic zone is located within the selected region, then the selected region is identified.

The steps of the preferred methods for identifying the geographic region which contains a geographic zone may be performed by a map server, for example, map server 206a of FIG. 2. Once longitude and latitude for a geographic point at the centroid of a zip code zone are provided by the geocoder 208, an application 202a–202n may request that the BTA which contains the geographic zone be identified. To request the identification of the BTA which contains the geographic zone, the application, for example 36a, sends the longitude and latitude for the geographic point at the centroid of a zip code zone via the DLL 202a and the map administrator 204 to one of the map servers, for example 206a. The map server 206a obtains the geographic coordinates for the zone boundary points of the geographic zone corresponding to the geographic point from the geographic zone libraries 218. The map server 206a also obtains the geographic coordinates for the region boundary points of the geographic regions from the geographic region libraries 214. In some of the preferred methods, the map server also obtains geographic coordinates for an estimated geographic zone from the estimated geographic zone libraries 216 and geographic coordinates for estimated geographic regions from the estimated geographic region libraries 212. In the preferred embodiment, the geographic zone libraries include data for the zone boundaries for the zip code zones within a geographic area and the estimated geographic zone libraries include data for the boundaries of corresponding estimated zip code zones. The geographic region libraries include data for the region boundaries for the BTA's within a geographic area and the estimated geographic region libraries include data for the region boundaries of corresponding estimated BTA's.

Boundary Point Pair Method

The first preferred method for identifying the geographic region which contains a geographic zone described herein is referred to as the Boundary Point Pair Method for ease of reference. The Boundary Point Pair Method follows the overall method of the Basic Method. In the Boundary Point Pair Method, a first determination as to whether the selected zone boundary point is located within the selected region is made by drawing a line of predetermined slope through the selected zone boundary point and through the selected region so that the line intersects the boundary of the selected region at a first boundary point and at a second boundary point. A first boundary point and a second boundary point comprise a boundary point pair. If the selected zone boundary point lies on the line between the first boundary point and the second boundary point, then the determination is that the selected zone boundary point is located within the selected region.

The Boundary Point Pair Method is illustrated by reference to the figures. FIG. 3 shows the geographic area 300 and a geographic zone 310 located in the geographic area. The geographic zone is defined by a zone boundary 312 of a plurality of zone boundary points (not individually illustrated). Information for the zone boundary points of a zip code zone may be obtained from a zip code zone library. Preferably, a zip code zone library contains an ordered set of zone boundary points with each zone boundary point described by longitude and latitude. The zone boundary points may be arranged in a clockwise or a counter-clockwise order. If the zone boundary points are arranged in a clockwise order, then the beginning zone boundary point is followed by the zone boundary point next encountered as the zone boundary of the geographic zone is traversed in a clockwise direction.

In FIG. 4, the geographic area 300 is divided into a plurality of non-overlapping geographic regions 410, 412, 414, 416, 418, 420, and 422. Each of these geographic regions is defined by a region boundary 430, 432, 434, 436, 438, 440, and 442, respectively. Each region boundary is made up of a plurality of region boundary points (not individually illustrated). In an application of the present invention by a wireless service provider, the geographic area 300 may be a multi-state area and the geographic regions 410, 412, 414, 416, 418, 420, and 422 may be BTA's.

Information for the division of the multi-state area into a plurality of BTA's and for the region boundary points of the BTA's may be obtained from a BTA library. Preferably, a BTA library contains an ordered set of region boundary points with each region boundary point described by longitude and latitude. The region boundary points may be arranged in a clockwise or a counter-clockwise order. If the region boundary points are arranged in a clockwise order, then the beginning region boundary point is followed by the region boundary point next encountered as the region boundary of the geographic region is traversed in a clockwise direction. For ease of explanation, a pair of axes 302 and 304 disposed at right angles to each other are shown in FIGS. 3–11. The horizontal axis 302 represents latitude and the vertical axis 304 represents longitude.

Figure 5:
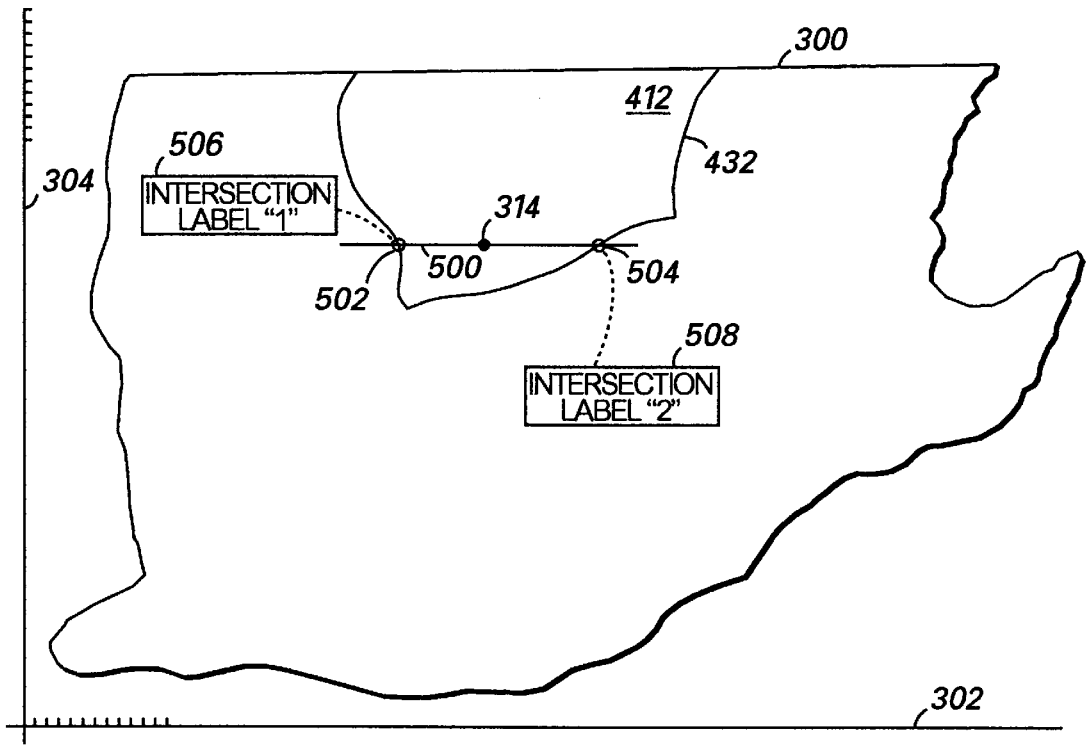
FIG. 5 illustrates a geographic region of the geographic area of FIG. 3 and intersection points between a line with predetermined slope and the boundary of the geographic region.

In FIG. 5, one of the plurality of zone boundary points of the geographic zone is selected as the selected zone boundary point 314 and geographic region 412 is selected as the selected region. A straight line 500 of predetermined slope is drawn through the selected zone boundary point 314 and through the selected region 412 so that the line intersects the boundary 432 of the selected region 412 at a first boundary point 502 and at a second boundary point 504. As shown in FIG. 5, the line is horizontal and has a slope of zero as defined by the geographic coordinate system of longitude and latitude. Preferably, a straight line with zero slope is used because all points on the line have a common latitude. This common latitude simplifies the determination as to whether the selected zone boundary point 314 lies on the line 500 between the first boundary point 502 and the second boundary point 504. In addition, a straight line with zero slope is easy to construct. Although other slopes and types of lines may be used, the adjustments required to account for a non-zero slope or a curved line may require additional computational time.

The first step in identifying the first boundary point and the second boundary point is to create a table of region boundary sides. A region boundary side is defined by two consecutive region boundary points. For example, if point 1, point 2 and point 3 are consecutive region boundary points, then point 1 and point 2 define a region boundary side and point 2 and point 3 define a region boundary side. A region boundary side is a straight line beginning at a region boundary point and ending at the next consecutive region boundary point. The table of region boundary sides includes an entry for each region boundary side. The first entry in the table of region boundary sides contains the region boundary side defined by a beginning region boundary point. Each entry in the table of region boundary sides contains longitude and latitude for the region boundary points which form the endpoints of the region boundary side. After the table of region boundary sides is created, the latitude for the line of predetermined slope is compared with the latitude of the region boundary points of each entry. If the latitude for one of the region boundary points is greater than or equal to the latitude for the line and the latitude for the other region boundary point is less than or equal to the latitude for the line, then the region boundary side is identified as an intersecting side. In the Boundary Point Pair Method, at least two region boundary sides are identified as intersecting sides.

The intersecting sides are used to determine the longitude for the first boundary point and the second boundary point. In the preferred embodiment, the latitude for the first boundary point and the second boundary point is known since the first boundary point and the second boundary point both lie along the line with zero slope drawn through the selected zone boundary point. The longitude for the first boundary point and the longitude for the second boundary point are calculated using the endpoints of the two intersecting sides. The following formula is used to calculate the longitude for an intersection point such as the first boundary point:

$$X_i = X_1 + ((Y_i - Y_1)/m)$$

where $X_i$ is the longitude for the intersection point, $X_1$ is the longitude for an endpoint of the intersecting side, $Y_i$ is the latitude for the line, $Y_1$ is the latitude for an endpoint of the intersecting side, and m is the slope of the intersecting side.

Once the longitude and latitude for the first boundary point and the second boundary point are identified, the longitude and latitude for the intersection points are placed in an intersection point table. The order of the entries in the intersection point table follow the order of the entries in the table of region boundary sides. An intersection point table is used as an aid in determining whether a selected zone boundary point lies within the selected region. Other aids to the determination of whether a selected zone boundary point lies within the selected region will occur to those skilled in the art.

Preferably, the intersection point table includes two columns, an intersection label column and an intersection point coordinates column. The intersection label column contains an intersection label for each intersection point. Intersection labels alternate between two types of intersection labels. In the preferred embodiment, the intersection labels alternate between odd numbers and even numbers. Sequential numbers are used for intersection labels so that the intersection labels reflect the relative positions of the intersection points along the line. For example, the first intersection point is labeled with intersection label "1" and the second intersection point is labeled with intersection label "2." If there are additional intersection points, then the next intersection point is labeled with intersection label "3" and the intersection point after that is labeled with intersection label "4". Intersection labeling continues until all intersection points are labeled. As will be apparent to those skilled in the art, any alternating labels may be used so long as the relative positions of the intersection points are maintained.

The intersection point coordinates column contains longitude and latitude for the intersection point. The number of rows in the intersection point table is determined by the number of intersection points. Generally, one row is included for each intersection point.

Once the intersection point table is completed, the longitude for the selected zone boundary point is compared to the longitude for the intersection points. If the longitude for the selected zone boundary point is equal to or between the longitude for a first boundary point and a second boundary point and the first boundary point has an odd intersection label and the second boundary point has an even intersection label, then the selected zone boundary point is located within the selected region. If the longitude for the selected zone boundary point is between the longitude for a second boundary point and a third boundary point and the second boundary point has an even intersection label and the third boundary point has an odd intersection label, then the selected zone boundary point is not located within the selected region.

The preferred methods use intersection tables to make a determination as to whether the selected zone boundary point is located within the selected region without graphing or mapping the selected zone boundary point and the selected region. The intersection table may not be visually apparent to the user.

Returning to the example illustrated by FIG. 5, the first boundary point 502 is labeled with intersection label "1" 506 and the second boundary point 504 is labeled with intersection label "2" 508. An intersection table for the example illustrated by FIG. 5 is shown by Table 1 below. Table 1 contains two rows, one for each intersection point. The first row contains intersection label "1" in the first column and the geographic coordinates for the first boundary point in the second column. The longitude for the first boundary point is $X_{502}$ and the latitude for the first boundary point is $Y_{502}$. The second row contains intersection label "2" in the first column and the geographic coordinates for the second boundary point in the second column. The longitude for the second boundary point is $X_{504}$ and the latitude for the second boundary point is $Y_{504}$.

TABLE 1

| Intersection Label | Intersection Point Coordinates |
|---|---|
| 1 | $(X_{502}, Y_{502})$ |
| 2 | $(X_{504}, Y_{504})$ |

Figure 6:
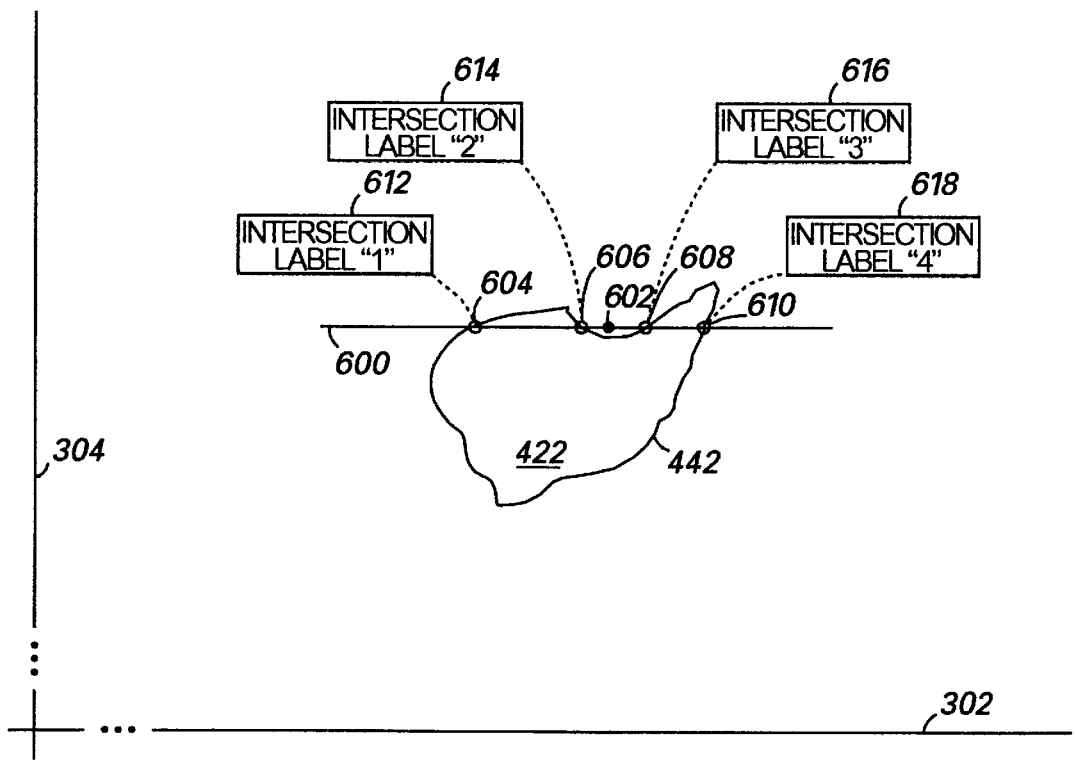
FIG. 6 illustrates a geographic region of the geographic area of FIG. 3 and intersection points between a line with predetermined slope and the boundary of the geographic region.

As mentioned above, there may be times when the line with predetermined slope intersects the boundary of the selected region so that there are multiple boundary point pairs. FIG. 6 shows an example with two boundary point pairs. In FIG. 6, geographic region 422 is selected as the selected region. A straight line 600 of predetermined slope is drawn through the selected zone boundary point 602 so that the line intersects the boundary 442 of the selected region 422 at a first boundary point 604 and at a second boundary point 606. The line 600 also intersects the boundary 442 of the selected region 422 at another first boundary point 608 and at another second boundary point 610.

The intersection points are determined by creating a table of region boundary sides to identify intersecting sides and by creating a table of intersection points as described above. The table of intersection points includes entries for the first boundary point 604 of the first boundary point pair, the second boundary point 606 of the first boundary point pair, the first boundary point 608 of the second boundary point pair, and the second boundary point 610 of the second boundary point pair. Preferably, the first boundary point 604 of the first boundary point pair is labeled with intersection label "1" 612, the second boundary point 606 of the first boundary point pair is labeled with intersection label "2" 614, the first boundary point 608 of the second boundary point pair is labeled with intersection label "3" 616, and the second boundary point 610 of the second boundary point pair is labeled with intersection label "4" 618. In this example, the table of intersection points has four rows because there are four intersection points. The first row contains intersection label "1" and the geographic coordinates ($X_{604}$, $Y_{604}$) for the first boundary point 604 of the first boundary point pair. The second row contains intersection label "2" and the geographic coordinates ($X_{606}$, $Y_{606}$) for the second boundary point 606 of the first boundary point pair. The third row contains intersection label "3" and the geographic coordinates ($X_{608}$, $Y_{608}$) for the first boundary point 608 of the second boundary point pair. The fourth row contains intersection label "4" and the geographic coordinates ($X_{610}$, $Y_{610}$) for the second boundary point 610 of the second boundary point pair. The intersection point table for this example is shown in Table 2.

TABLE 2

| Intersection Label | Intersection Point Coordinates |
| --- | --- |
| 1 | ($X_{604}$, $Y_{606}$) |
| 2 | ($X_{606}$, $Y_{606}$) |
| 3 | ($X_{608}$, $Y_{608}$) |
| 4 | ($X_{610}$, $Y_{610}$) |

After Table 2 is built, the longitude for the selected zone boundary point 602 is compared to the longitude for the intersection points. In this example, the longitude for the selected zone boundary point 602 is between the second boundary point 606 of the first boundary point pair and the first boundary point 608 of the second boundary point pair. The second boundary point 606 of the first boundary point pair has an even intersection label and the first boundary point 608 of the second boundary point pair has an odd intersection label so the determination is that the selected zone boundary point is not located within the selected region.

Continuing with the Boundary Point Pair Method, the selected zone boundary point may not lie on the line between a first boundary point and a second boundary point. Then, preferably the determination is that the selected zone boundary point is not located within the selected region. In that case, another one of the geographic regions is selected as the selected region and a determination is made as to whether the selected zone boundary point is located within that selected region. Further details are provided by reference to FIG. 7.

Figure 7:
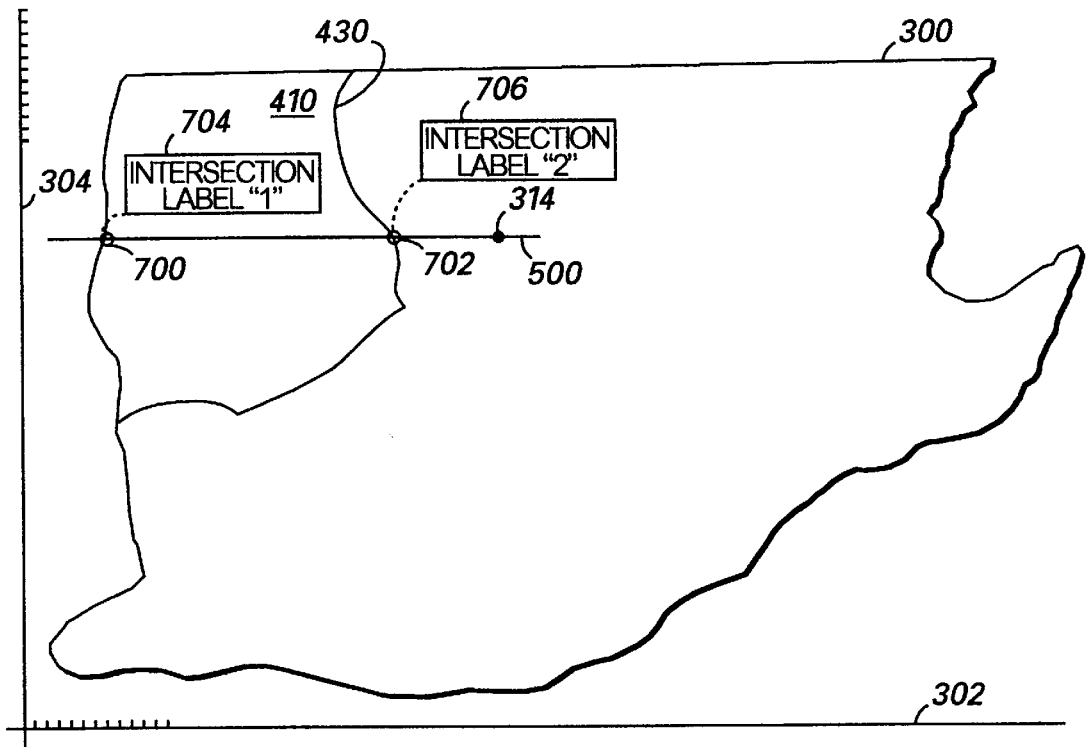
FIG. 7 illustrates a geographic region of the geographic area of FIG. 3 and intersection points between a line with predetermined slope and the boundary of the geographic region.

In FIG. 7, an example is provided of a selected zone boundary point that is not located within a selected region. In this example, the selected zone boundary point 314 is the same as the selected zone boundary point used in connection with the example illustrated in FIG. 5. Instead of geographic region 412 being selected as the selected region, in FIG. 7, geographic region 410 is selected as the selected region. As in the previous example, a straight line 500 of predetermined slope is drawn through the selected zone boundary point 314 and through the selected region 410 so that the line intersects the boundary 430 of the selected region 410 at a first boundary point 700 of the selected region and at a second boundary point 702 of the selected region.

As described above, a table of region boundary sides is created and a table of intersecting points is created. In this example, the first boundary point 700 is labeled with intersection label "1" 704 and the second boundary point 702 is labeled with intersection label "2" 706. The table of intersecting points contains two rows. The first row contains intersection label "1" in the first column and the geographic coordinates ($X_{700}$, $Y_{700}$) for the first boundary point 700 in the second column. The second row contains intersection label "2" in the first column and the geographic coordinates ($X_{702}$, $Y_{702}$) for the second boundary point 702 in the second column. The intersection point table for this example is shown in Table 3.

TABLE 3

| Intersection Label | Intersection Point Coordinates |
| --- | --- |
| 1 | ($X_{700}$, $Y_{700}$) |
| 2 | ($X_{702}$, $Y_{702}$) |

After the table is built, the longitude for the selected zone boundary point 314 is compared to the longitude for the first boundary point 700 and the second boundary point 702. In this example, the longitude for the selected zone boundary point is not between the longitude for first boundary point and the second boundary point so the determination is that the selected zone boundary point does not lie on a line between the first boundary point and the second boundary point.

Single Boundary Point Method

There may be times when a selected zone boundary point is located such that a straight line drawn through the selected zone boundary point will not intersect the selected region at a first boundary point and at a second boundary point. This situation is handled by another one of the preferred methods, the Single Boundary Point Method. The Single Boundary Point Method also uses the Basic Method. In the Single Boundary Point Method, the step of making a first determination as to whether the selected zone boundary point is located within the selected region is made by drawing a line of predetermined slope through the selected zone boundary point and through the selected region. After the line is drawn, a check is made to determine whether the line intersects the selected region at the selected zone boundary point. If the line intersects the boundary of the selected region at the selected zone boundary point, then the determination is that the selected zone boundary point is located within the selected region.

A variation of the Single Boundary Point Method may include checking whether the line intersects the selected region at the selected zone boundary point only. If the line intersects the selected region at the selected zone boundary point only, then the determination is that the selected zone boundary point is located within the selected region.

Figure 8:
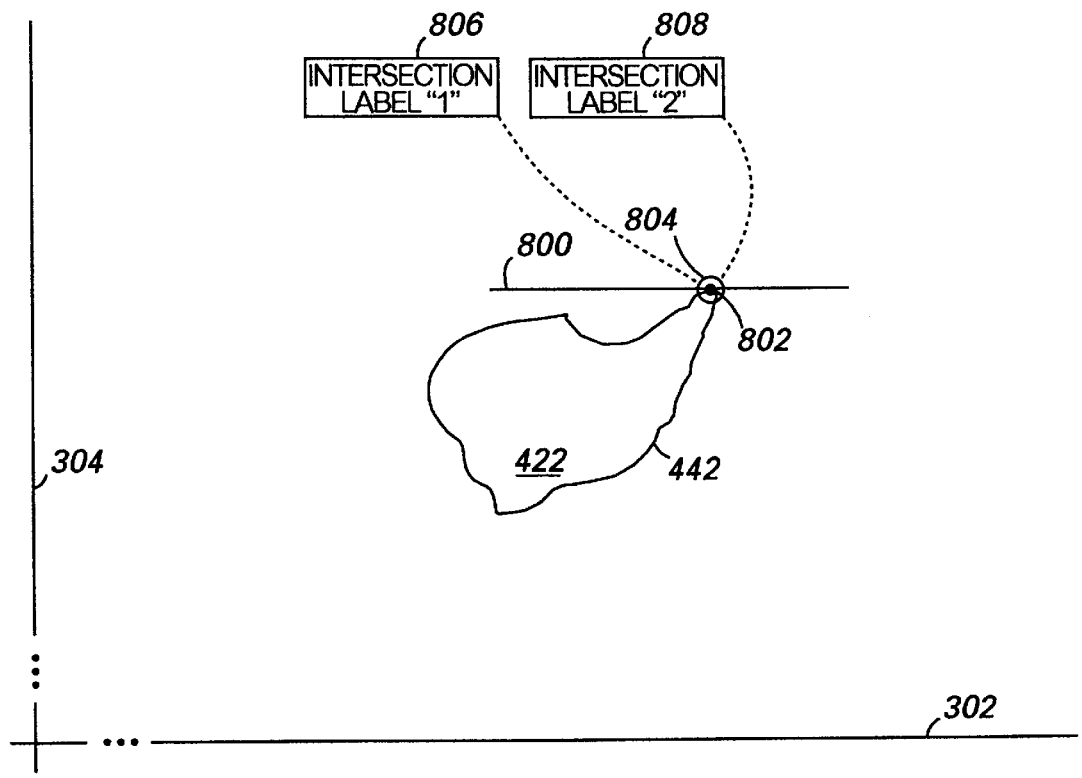
FIG. 8 illustrates a geographic region of the geographic area of FIG. 3 and an intersection point between a line with predetermined slope and the boundary of the geographic region.

Aspects of the Single Boundary Point Method are illustrated by reference to FIG. 8. FIG. 8 illustrates the Single Boundary Point Method using selected zone boundary point

802. In FIG. 8, geographic region 422 is selected as the selected region. Preferably, a straight line 800 of predetermined slope is drawn through the selected zone boundary point 802. In the preferred embodiment, the line 800 is horizontal and has a slope of zero. The comments regarding the slope of the line made in connection with the description of the Boundary Point Pair Method are also applicable to the Single Boundary Point Method.

The steps for making a determination as to whether the selected zone boundary point is located within the geographic region for the Single Boundary Point Method are similar to the steps described above in connection with the Boundary Point Pair Method. A table of region boundary sides is created to identify intersecting sides. In this method, the latitude for one of the region boundary points of an intersecting side equals the latitude for the line so two intersecting sides with a common endpoint are identified. The common endpoint is identified as an intersection point. Although the intersection point table generally contains one entry for each intersection point, under these conditions, two entries may be created for a single intersection point. One entry is created if the direction of the slopes of the adjacent intersecting sides are the same. Two entries are created if the directions of the slopes of the adjacent intersecting sides are different. The directions of the slopes of the adjacent intersecting sides are different if the line with predetermined slope is tangential to the intersection point and does not intersect an immediately adjacent region boundary point of the selected region. If the intersection point is entered in the table once, then the intersection point is assigned one intersection label. If the intersection point is entered in the table twice, then the intersection point is assigned two consecutive intersection labels.

The steps for making a determination as to whether the selected zone boundary point is located within the Geographic region may be illustrated by FIG. 8. In FIG. 8, the line 800 intersects the region boundary 442 of the selected region 422 at intersection point 804. In this example, two entries in the intersection point table are created for intersection point 804 because the direction of the slopes of the adjacent intersection sides are different. In other words, the line with predetermined slope is tangential to the intersection point and does not intersect an immediately adjacent boundary point of the selected region.

The intersection point table for the example illustrated by FIG. 8 is shown in Table 4. The intersection labels are shown graphically in FIG. 8. Intersection point 804 is labeled with two intersection labels "1" 806 and intersection label "2" 808 because the line 800 is tangential to the intersection point 804 and does not intersect an immediately adjacent region boundary point of the selected region 422. In this example, the longitude for the selected zone boundary point is equal to the longitude for the intersection points so the determination is that the selected zone boundary point is located within the selected region.

TABLE 4

| Intersection Label | Intersection Point Coordinates |
| --- | --- |
| 1 | $(X_{804}, Y_{804})$ |
| 2 | $(X_{804}, Y_{804})$ |

In the Single Boundary Point Method, the line may not intersect the boundary of the selected region at the selected zone boundary point. If the line does not intersect the boundary of the selected region at the selected zone boundary point, then preferably the determination is that the selected zone boundary point is not located within the selected region.

In the Boundary Point Pair Method and the Single Boundary Point Method, if the first determination is that the selected zone boundary point is located within the selected region, then the step of making a determination as to whether the selected zone boundary point is located within the selected region is repeated with another zone boundary point as the selected zone boundary point.

If at least a predetermined percentage of the plurality of zone boundary points is located within the selected region, then the selected region may be identified. If each geographic region has a name, then the step of identifying the selected region preferably includes identifying the selected region by the name of the selected region. Other ways of identifying a selected region other than by name, such as by number or the longitude and latitude of the centroid of the selected region, will occur to those skilled in the art.

In the Boundary Point Pair Method and the Single Boundary Point Method, if the first determination is that the selected zone boundary point is not located within the selected region, then preferably, another one of the geographic regions is selected as the selected region and a first determination is made as to whether the selected zone boundary point is located within that selected region. Preferably, the step of selecting one of the geographic regions as a selected geographic region and the step of making a determination as to whether the selected zone boundary point is located within the geographic region are repeated until the first determination is that the selected zone boundary point is located within the selected region. In this manner, the geographic region which contains a geographic zone is identified.

Preferred Methods for Identifying the Geographic Region Which Contains a Geographic Zone Using Estimated Geooraphic Regions One group of preferred methods uses estimated geographic regions and an estimated geographic zone to identify the geographic region which contains a geographic zone. Estimated geographic regions and an estimated geographic zone are used because it may be faster and easier to determine whether an estimated geographic zone is located within an estimated geographic region than to determine whether a geographic zone is located within a geographic region.

Figure 9:
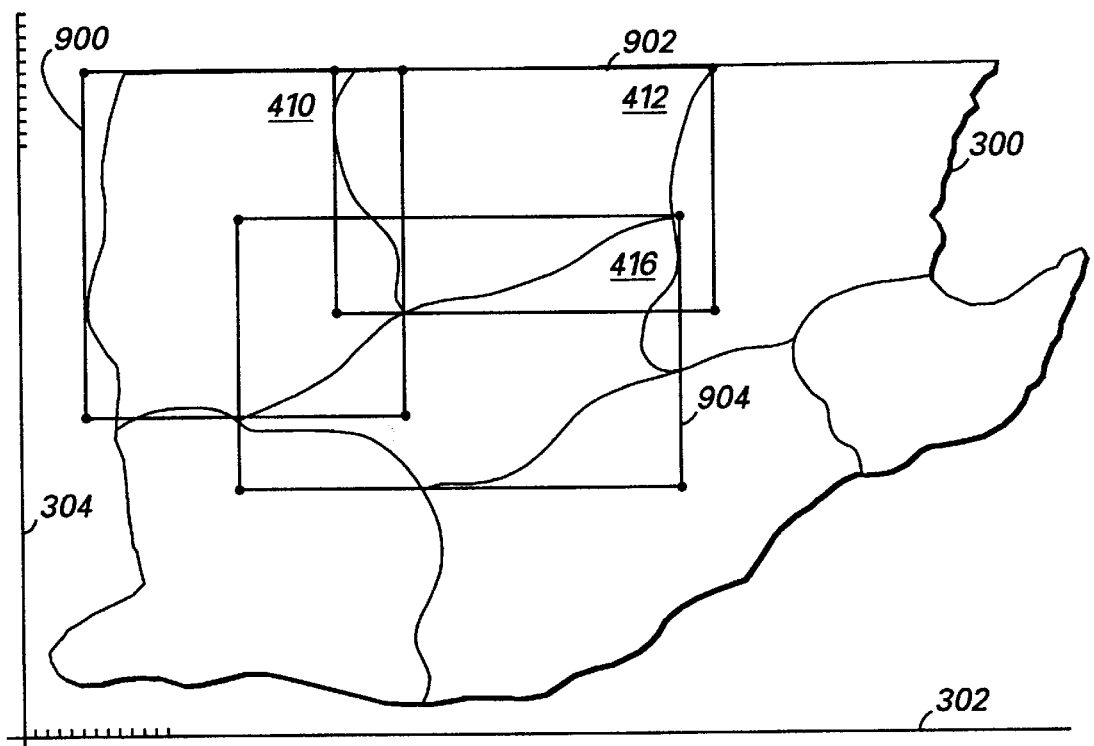
FIG. 9 illustrates the geographic regions of FIG. 4 and estimated geographic regions for three of the geographic regions.

Estimated geographic regions are illustrated by the figures. FIG. 4 shows the geographic area 300 divided into a plurality of non-overlapping geographic regions 410, 412, 414, 416, 418, 420, and 422. Each of these geographic regions may be estimated by a corresponding estimated geographic region. As shown in FIG. 9, geographic regions 410, 412 and 416 may be estimated by estimated geographic regions 900, 902 and 904 respectively. An estimated geographic region may estimate the corresponding geographic region with a regular-shaped region. A regular-shaped region is generally a symmetrical region with well-known geometric properties. For example, FIG. 9 shows rectangular-shaped estimated geographic regions. Each of the rectangular-shaped estimated geographic regions totally encompasses the corresponding geographic region. In the preferred embodiment, rectangular-shaped estimated geographic regions are used because they are easy to construct and information regarding them is easy to store. For example, only two longitudinal coordinates and two latitudinal coordinates are needed to describe a rectangular-shaped estimated geographic region. In addition, rectangular-shaped estimated geographic regions simplify the determination as to whether an estimated geographic zone is located within the selected estimated region. As will be apparent to those skilled in the art, other shapes and sizes could be used for the estimated geographic regions. Although the geographic regions are non-overlapping, the estimated geographic regions may overlap.

Figure 10:
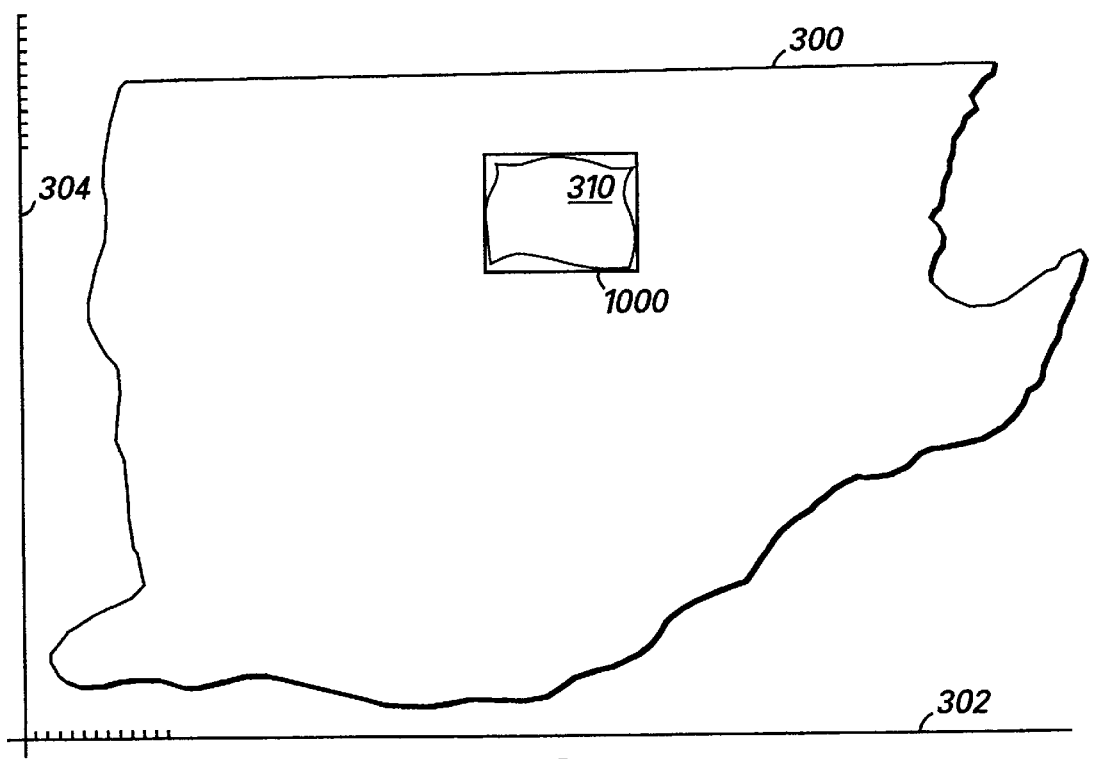
FIG. 10 illustrates the geographic area of FIG. 3 and a geographic zone.

In addition to using estimated geographic regions, this group of preferred methods also uses an estimated geographic zone. FIG. 10 shows a geographic zone 310 estimated by an estimated zone 1000. As shown in FIG. 10, an estimated geographic zone may estimate the corresponding geographic zone with a regular-shaped zone. A regular-shaped zone is generally a symmetrical zone with well-known geometric properties. For example, FIG. 10, shows a rectangular-shaped estimated geographic zone which totally encompasses the corresponding geographic zone. In the preferred embodiment, a rectangular-shaped estimated geographic zone is used because it is easy to construct and information regarding the estimated geographic zone is easy to store. For example, only two longitudinal coordinates and two latitudinal coordinates are needed to describe a rectangular-shaped estimated geographic zone. In addition, a rectangular-shaped estimated geographic zone simplifies the determination as to whether an estimated geographic zone is located within the selected estimated region. As will be apparent to those skilled in the art, other shapes and sizes could be used for the estimated geographic zone.

The preferred methods which use estimated geographic regions and an estimated geographic zone follow the overall method of the Basic Method. The methods in the group which use estimated geographic regions expand the step of selecting a geographic region as a selected region. In the group of preferred methods using estimated geographic regions, the step of selecting a geographic region as a selected region further includes estimating the geographic zone with an estimated zone, estimating the geographic region with a selected estimated region and making a first determination as to whether the estimated zone is located within the selected estimated region. The selection of a geographic region may be arbitrary or may be based on some type of hierarchy. For example, if the geographic area is divided into geographic regions representing BTA's, the geographic region for the BTA last identified as containing a geographic zone or for the BTA most often identified as containing a geographic zone may be selected.

If the first determination is that the estimated zone is located within the selected estimated region, then one of the plurality of zone boundary points is selected as a selected zone boundary point and a second determination is made as to whether the selected zone boundary point is located within the selected region. With respect to the step of making a second determination as to whether the selected zone boundary point is located within the selected region, the group of preferred methods which use estimated geographic regions is similar to the group of preferred methods which do not use estimated geographic regions described above.

Boundary Point Pair Method Using Estimated Geographic Regions

The first method for identifying the geographic region which contains a geographic zone using an estimated geographic region and an estimated geographic zone as described herein is referred to as the Boundary Point Pair Method Using Estimated Geographic Regions for ease of reference. The Boundary Point Pair Method Using Estimated Geographic Regions follows the overall method of the Basic Method. In this preferred method, the step of selecting a geographic region as the selected region includes the steps of estimating the geographic zone with an estimated zone, estimating the geographic region with a selected estimated region, making a determination as to whether the estimated zone is located within the selected estimated region, and if the estimated zone is located within the selected estimated region, then selecting the corresponding geographic region as the selected region.

After a geographic region is selected as the selected region, a determination is made as to whether the geographic zone is located within the selected region. In the Boundary Point Pair Method Using Estimated Geographic Regions, the step of making a determination as to whether the geographic zone is located within the selected region is similar to that of the Boundary Point Pair Method. The determination as to whether the geographic zone is located within the selected region is made by selecting a zone boundary point as a selected zone boundary point and drawing a line of predetermined slope through the selected zone boundary point and through the selected region so that the line intersects the boundary of the selected region at a first boundary point and at a second boundary point. If the selected zone boundary point lies on the line between the first boundary point and the second boundary point, then the determination is that the selected zone boundary point is located within the selected region.

Figure 11:
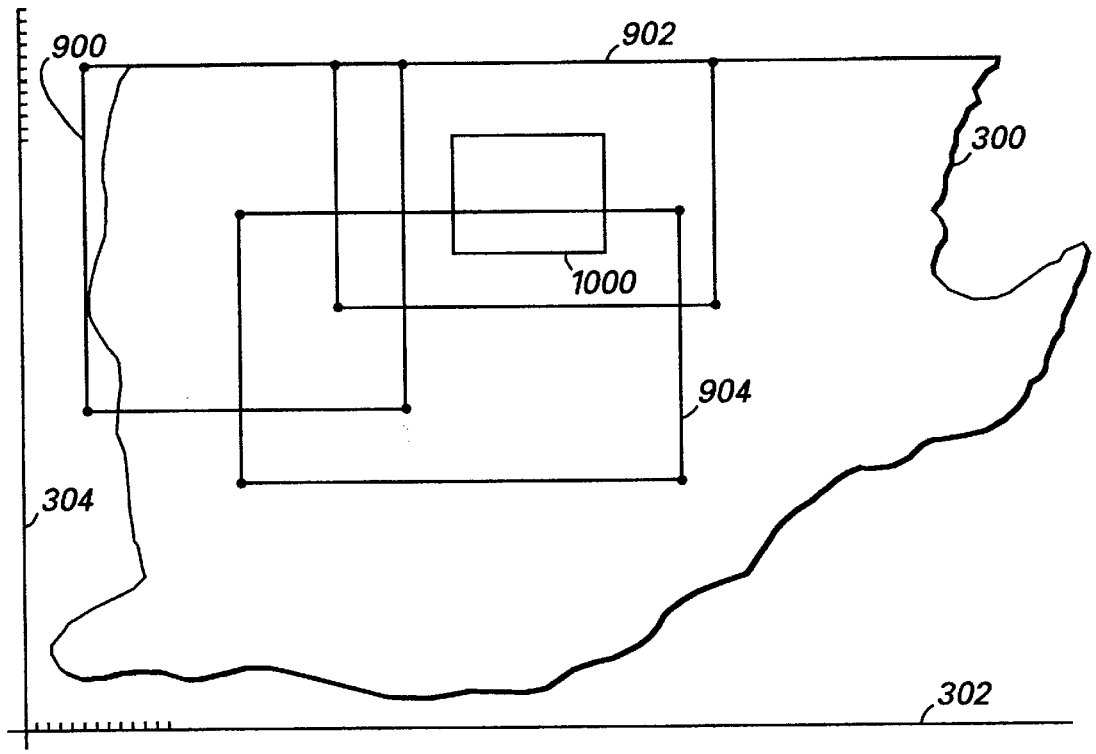
FIG. 11 illustrates the estimated geographic regions of FIG. 9 and an estimated geographic zone.

The Boundary Point Pair Method Using Estimated Geographic Regions is illustrated by reference to the figures. FIG. 3 shows the geographic area 300 and a geographic zone 310 located in the geographic area. In FIG. 4, the geographic area of FIG. 3 is divided into a plurality of non-overlapping geographic regions 410, 412, 414, 416, 418, 420 and 422. FIG. 10 shows the geographic zone 310 estimated by an estimated zone 1000. In this example, geographic region 412 is selected as the selected region and is estimated by the selected estimated region 902, as shown in FIG. 9. FIG. 11 shows the estimated zone 1000 and the selected estimated region 902.

The first determination as to whether the estimated zone is located within the selected estimated region is made by comparing the geographic coordinates for the estimated zone with the geographic coordinates for the selected estimated region. Preferably, the selected estimated region is described by two longitudinal coordinates and two latitudinal coordinates and the selected estimated zone is described by two longitudinal coordinates and two latitudinal coordinates. If both latitudinal coordinates for the estimated zone are between the two latitudinal coordinates for the selected estimated region and both longitudinal coordinates for the estimated zone are between the two longitudinal coordinates for the selected estimated region, then the estimated zone is located within the selected estimated region. In this example, the determination as to whether the estimated zone is located within the selected estimated region is that the estimated zone 1000 is located within the selected estimated region 902.

Since the estimated zone 1000 is located within the selected estimated region 902, one of the zone boundary points of the geographic zone is selected as a selected zone boundary point. In this example, zone boundary point 314 is selected as the selected zone boundary point. The step of making a second determination as to whether the selected zone boundary point 314 is located within the selected region 412 is illustrated by FIG. 5. In the Boundary Point Pair Method Using Estimated Geographic Regions, the step of making a second determination as to whether the selected zone boundary point is located within the selected region is similar to the step of making a first determination described in connection with the Boundary Point Pair Method. As shown by FIG. 5, a line 500 of predetermined slope is drawn through the selected zone boundary point 314 and through the selected region 412 so that the line intersects the boundary 442 of the selected region 412 at a first boundary point 502 and at a second boundary point 504.

To make a determination as to whether the selected zone boundary point 314 is located within the selected region 412, a table of region boundary sides is built and a table of intersection 1s points is built. The details of building a table of intersecting sides and building a table of intersection points are discussed above in connection with the Boundary Point Pair Method. In this example, the first boundary point 502 is labeled with intersection label "1" 506 and the second boundary point 504 is labeled with intersection label "2" 507. As discussed above, the determination is that the selected zone boundary point 314 lies on the line between the first boundary point 502 and the second boundary point 504. Thus, the determination is that the selected zone boundary point 314 is located within the selected region 412. Once the determination is made that the geographic point 314 is located within the selected region 412, no other estimated geographic regions or geographic regions are checked.

Single Boundary Point Method Using Estimated Geographic Regions

As discussed above in connection with the Single Boundary Point Method, there may be times when a selected zone boundary point is located such that a straight line drawn through the selected zone boundary point will not intersect the selected region at a first boundary point and at a second boundary point. In the group of preferred methods which use estimated geographic regions, this situation is handled by the Single Boundary Point Method Using Estimated Geographic Regions. The Single Boundary Point Method Using Estimated Geographic Regions follows the overall method of the Basic Method. This method includes the additional steps of estimating the geographic zone with an estimated zone, estimating the geographic region with a selected estimated region, making a first determination as to whether the estimated zone is located within the selected estimated region, and if the estimated zone is located within the selected estimated region, then selecting the corresponding geographic region as the selected region.

In the Single Boundary Point Method Using Estimated Geographic Regions, the step of making a second determination as to whether the selected zone boundary point is located within the selected region is similar to the step of making a first determination described above in connection with of the Single Boundary Point Method. The second determination as to whether the selected zone boundary point is located within the selected region is made by drawing a straight line of predetermined slope through the selected zone boundary point and through the selected region. The second determination includes checking whether the line intersects the selected region at the selected zone boundary point. If the line intersects the boundary of the selected region at the selected zone boundary point, then the second determination is that the selected zone boundary point is located within the selected region. A variation of the Single Boundary Point Method Using Estimated Geographic Regions may include checking whether the line intersects the selected region at the selected zone boundary point only. If the line intersects the selected region at the selected zone boundary point only, then the second determination is that the selected zone boundary point is located within the selected region.

In the Boundary Point Pair Method Using Estimated Geographic Regions and the Single Boundary Point Method Using Estimated Geographic Regions, if the second determination is that the selected zone boundary point is located within the selected region, then another zone boundary point is selected as a selected zone boundary point. Once a zone boundary point is selected as a selected zone boundary point, the step of making a second determination as to whether the selected zone boundary point is located within the selected estimated region is repeated with that zone boundary point. If at least a predetermined percentage of the zone boundary points are located within the selected region, then preferably, the selected region is identified. The step of identifying the selected region preferably includes identifying the selected region by the name of the selected region. Other ways of identifying the geographic region which contains a geographic zone will be apparent to those skilled in the art.

In the group of preferred methods which use estimated geographic regions, if the first determination is that the selected zone boundary point is not located within the selected estimated region, then preferably, the steps of selecting a geographic region as a selected region, estimating the selected region with a selected estimated region and making a determination as to whether the estimated zone is located within the selected estimated region are repeated. These steps are repeated until the first determination is that the estimated zone is located within the selected estimated region.

The steps referenced in the immediately preceding paragraph are illustrated by FIG. 9 and 11 using, estimated zone 1000. Referring to FIG. 9, if geographic region 410 is selected as the selected region, then the selected region is estimated by selected estimated region 900. In FIG. 11, a first determination is made as to whether the estimated zone 1000 is located within the selected estimated region 900. The first determination is that the estimated zone 1000 is not located within the selected estimated region 900 because the latitudinal coordinates for the estimated zone are not between the latitudinal coordinates for the selected estimated region and the longitudinal coordinates for the estimated zone are not between the longitudinal coordinates for the selected estimated region. Based upon the first determination that the estimated zone is not located within the selected estimated region, another geographic region is selected as the selected region.

If geographic region 412 is selected next as the selected region, then, as described in connection with the Boundary Point Pair Method Using Estimated Geographic Regions, the first determination is that the estimated zone 1000 is located within the selected estimated region 902. Based upon the first determination that the estimated zone 1000 is located within the selected estimated region 902, the next steps are to select one of the zone boundary points as the selected zone boundary point and to make a second determination as to whether the selected zone boundary point is located within the selected region 332. If zone boundary point 324 is selected as the selected zone boundary point, then, as previously described, the second determination is that the selected zone boundary point 324 is located within the selected region 332.

Advantageously, the estimated geographic regions and the estimated geographic zone are used in the present invention to decrease the time necessary to identify the geographic region which contains a geographic zone. In the preferred embodiment, the estimated geographic regions and the estimated zone are regular-shaped. Each estimated geographic region totally encompasses a corresponding geographic region. Similarly, the estimated zone totally encompasses the corresponding geographic zone. It is faster to make a determination as to whether a regular-shaped estimated zone is located within a regular-shaped estimated geographic region than to make a determination as to whether an irregular-shaped geographic zone is located within an irregular-shaped geographic region. The use of an estimated geographic region which totally encompasses a corresponding geographic region and an estimated geographic zone which totally encompasses a corresponding geographic zone insures that the determination as to whether the estimated zone is located within the estimated geographic region is that the estimated zone is located within the estimated geographic region whenever the geographic zone is located within the geographic region. If an estimated geographic region does not totally encompass a corresponding geographic region, then the determination may be that the estimated zone is not located within the selected estimated region even though the geographic zone is located within the corresponding geographic region.

Figure 12:
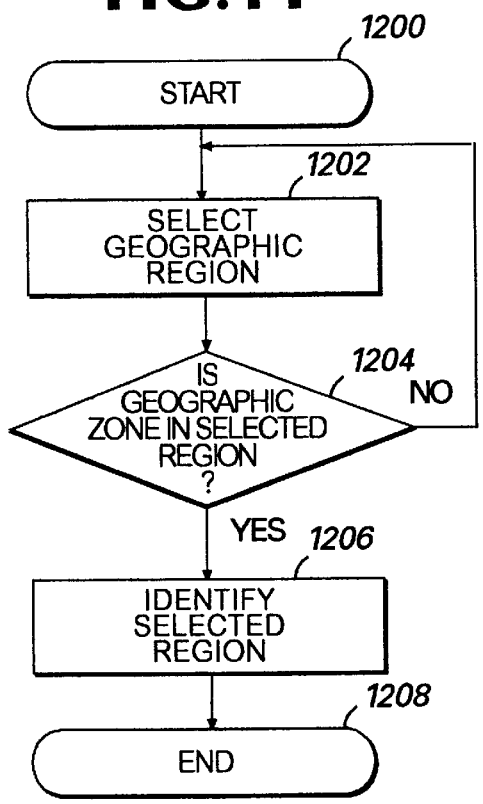
FIG. 12 is a flow diagram illustrating the preferred method for identifying the geographic region of a geographic area which contains a geographic zone.

Flow Diagrams for the Preferred Methods for Identifying the Geographic Region which Contains a Geographic Point Basic Method The common overall method shared by the preferred methods of identifying the geographic region which contains a geographic zone, the Basic Method, is shown in FIG. 12. The method begins at step 1200 with the receipt of a geographic zone. The method then proceeds to step 1202 where one of the geographic regions is selected as the selected region. In step 1204, a determination is made as to whether the geographic zone is located within the selected region. If the geographic zone is located within the selected region, then the selected region is identified in step 1206 and the method ends at step 1208. If the geographic zone is not located within the selected region in step 1204, then another geographic region is selected. Geographic regions continue to be selected until the geographic region which contains the geographic zone is identified.

Selection of a Geographic Region as the Selected Region

Figures 13, 14:
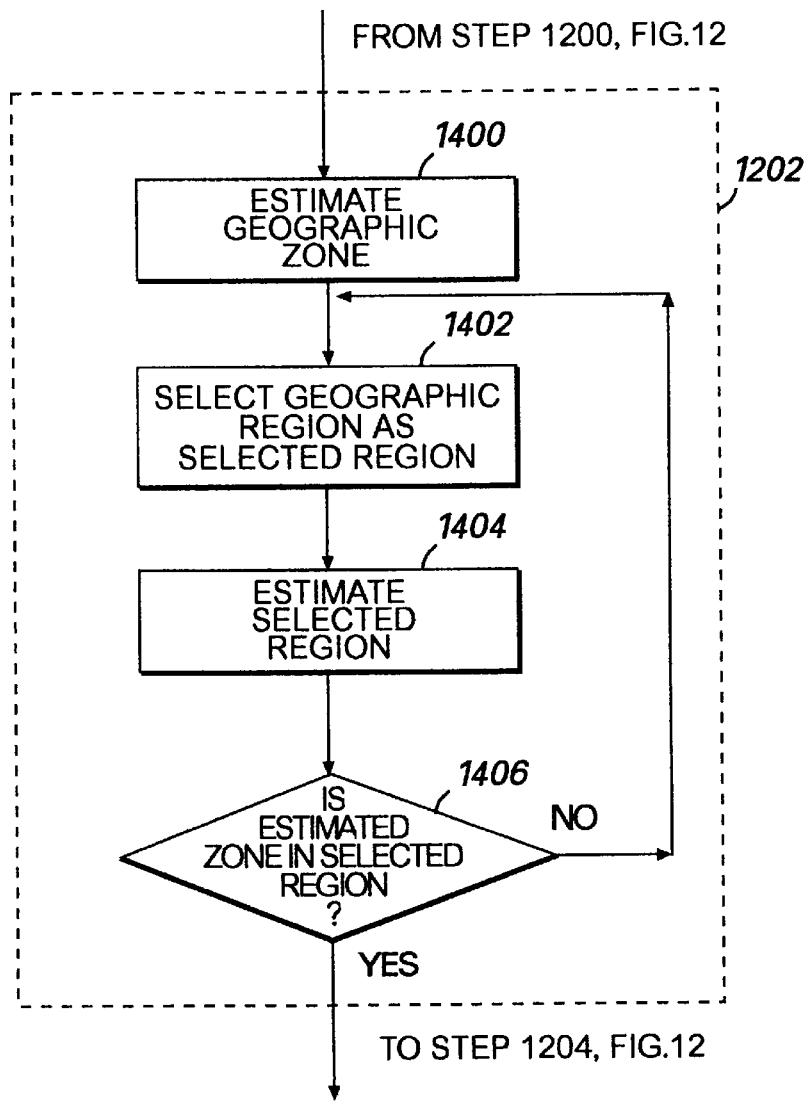
FIG. 13 is a flow diagram illustrating one of the preferred methods for dividing a geographic area into geographic regions.
FIG. 14 is a flow diagram illustrating one of the preferred methods for selecting a geographic region.

As described in the Boundary Point Pair Method and the Single Boundary Point Method above, the step of selecting a geographic region as a selected region may include the additional step of dividing the geographic area into geographic regions as shown in FIG. 13. The geographic area is divided into a plurality of geographic regions in step 1300 of FIG. 13. Alternatively, as in the Boundary Point Pair Method Using Estimated Geographic Regions and the Single Boundary Point Method Using Estimated Geographic Regions, the geographic area may be divided into geographic regions before the method begins.

The Boundary Point Pair Method Using Estimated Geographic Regions and the Single Boundary Point Method Using Estimated Geographic Regions use estimated geographic regions. FIG. 14 illustrates the step of selecting one of the geographic regions as a selected region when a preferred method using estimated geographic regions is used. In step 1400, the geographic zone is estimated by an estimated zone. Then, in step 1402 one of the geographic regions is selected as the selected region. Once the selected region is selected then, in step 1404, the selected region is estimated by a selected estimated region. Next, in step 1406 a determination is made as to whether the estimated zone is located within the selected estimated region. If the estimated zone is located within the selected estimated region, then the method proceeds to step 1204. If the estimated zone is not located within the selected estimated region, then another geographic region is selected as the selected region in step 1402, and steps 1404 and 1406 are repeated. Steps 1402, 1404 and 1406 are repeated until the estimated zone is located within the selected estimated region.

Determination as to Whether a Geographic Zone is Located in the Selected Region

The step of making a determination as to whether the geographic zone is located within the selected region is common to all the preferred methods and is shown as step 1204 in FIG. 12. The preferred methods provide different ways to make a determination as to whether the geographic zone is located within the selected region by using different steps for determining whether a selected zone boundary point in located within the selected region. The alternatives used by the different methods are shown in FIGS. 15, 16 and 17.

Figure 15:
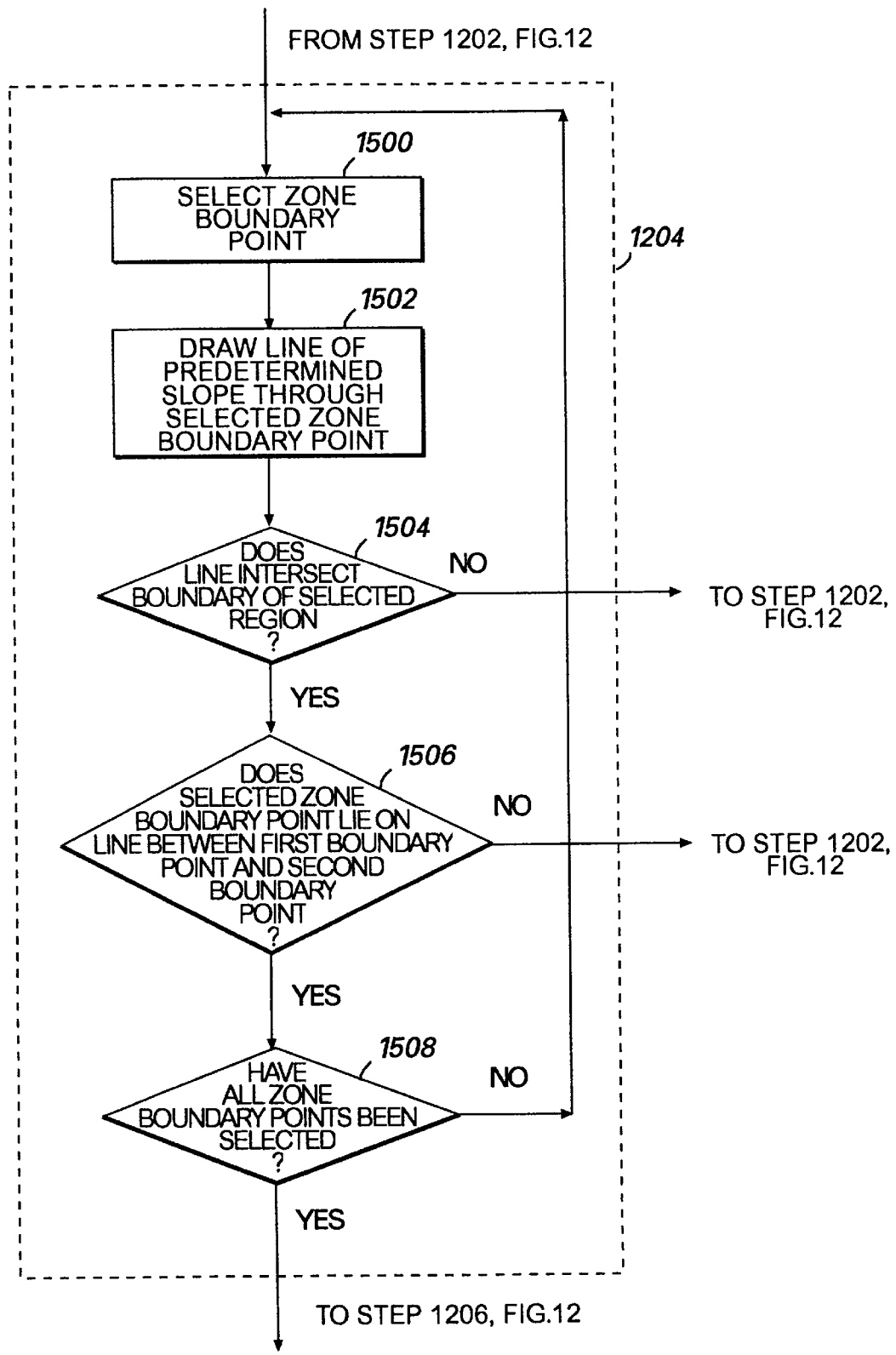
FIG. 15 is a flow diagram illustrating one of the preferred methods for determining whether a zone boundary point is located within a selected region.

FIG. 15 illustrates step 1204 as described in the Boundary Point Pair Method and the Boundary Point Pair Method Using Estimated Geographic Regions. In step 1500 of FIG. 15, one of the zone boundary points is selected as a selected zone boundary point. Then, in step 1502 a straight line of predetermined slope is drawn through the selected zone boundary point. A determination is made as to whether the line of predetermined slope intersects the boundary of the selected region in step 1504. If the line does not intersect the boundary of the selected region, then another geographic region is selected as the selected region in step 1202. Geographic regions continue to be selected as the selected region until the line intersects the boundary of the selected region. If the line intersects the boundary of the selected region, then the method proceeds to step 1506. In step 1506, a determination is made as to whether the selected zone boundary point lies on the line between the first boundary point and the second boundary point. If the selected zone boundary point lies on the line between the first boundary point and the second boundary point, then the selected zone boundary point is located within the selected region. If the selected zone boundary point does not lie on the line between the first boundary point and the second boundary point, then steps 1202, 1500, 1502, 1504 and 1506 are repeated until the selected zone boundary point is located within the selected region. If the selected zone boundary point lies on the line between the first boundary point and the second boundary point, then a determination is made as to whether all the zone boundary points have been selected as a selected zone boundary point in step 1508. If all the zone boundary points have been selected as a selected zone boundary point, then the method proceeds to step 1206. If all the zone boundary points have not been selected as a selected zone boundary point, then steps 1500, 1502, 1504, 1506 and 1508 are repeated.

Figure 16:
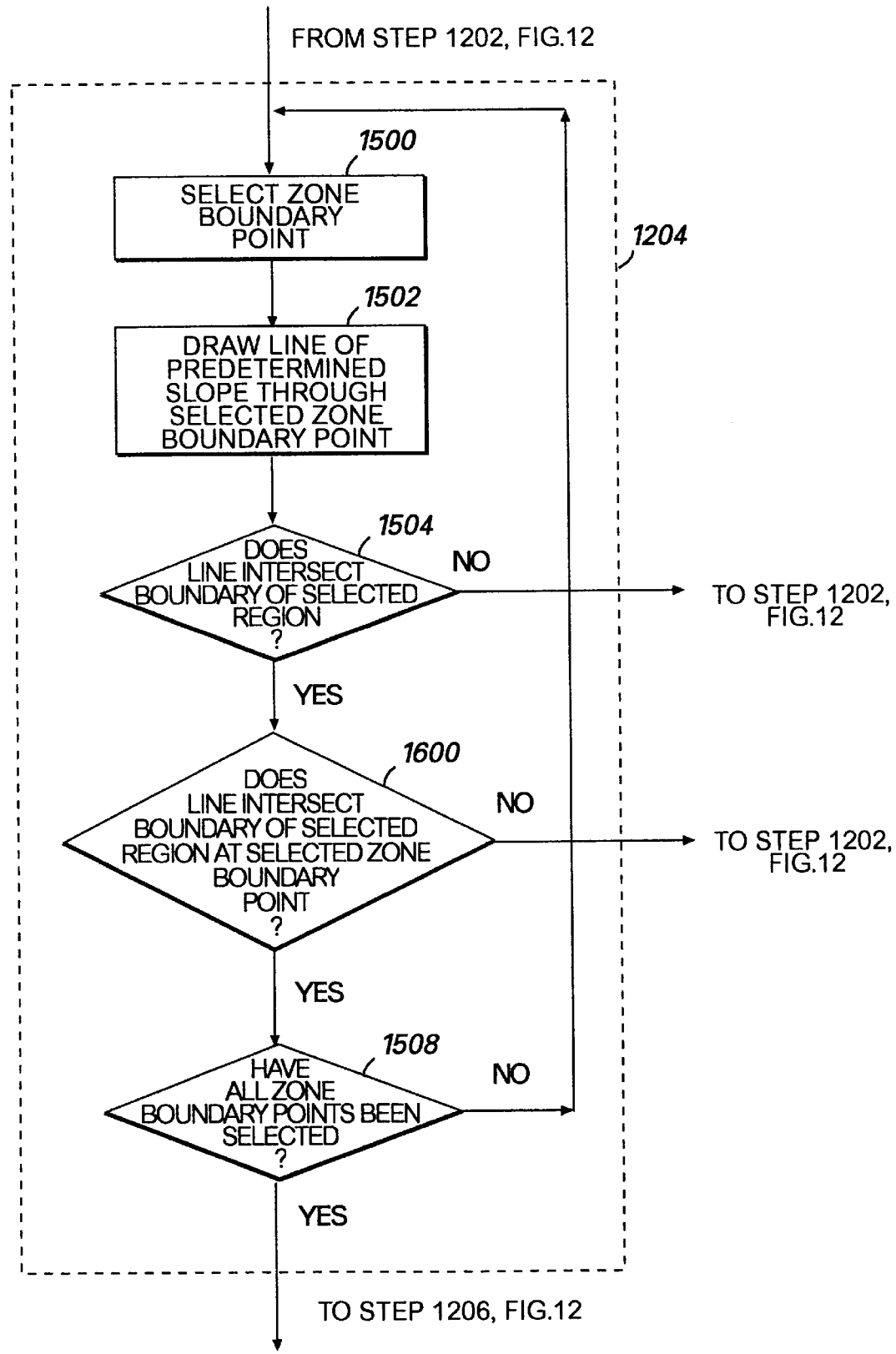
FIG. 16 is a flow diagram illustrating one of the preferred methods for determining whether a zone boundary point is located within a selected region.

Another alternative for step 1204 is shown in FIG. 16 and is described by the Single Boundary Point Method and the Single Boundary Point Method Using Estimated Geographic Regions. Beginning at step 1500, one of the zone boundary points is selected as a selected zone boundary point. Then, in step 1502 a line of predetermined slope is drawn through the selected zone boundary point. A determination is made as to whether the line of predetermined slope intersects the boundary of the selected region in step 1502. If the line does not intersect the boundary of the selected region, then another geographic region is selected. Steps 1202, 1500, 1502 and 1504 are repeated until the line intersects the boundary of the selected region. If the line intersects the boundary of the selected region, then in step 1600 a determination is made as to whether the line intersects the boundary of the selected region at the selected zone boundary point. If the line intersects the boundary of the selected region at the selected zone boundary point, the selected zone boundary point is located within the geographic region. If the line does not intersect the boundary of the selected region at the selected zone boundary point, the selected zone boundary point is not located within the selected region and steps 1202, 1500 1502, 1504 and 1600 are repeated until the selected zone boundary point is located within the selected region. If the line intersects the boundary of the selected region at the selected zone boundary point, then a determination is made in step 1508 as to whether all the zone boundary points have been selected as selected zone boundary points. If all the zone boundary points have been selected, then the method proceeds to step 1206. If all the zone boundary points have not been selected, then another zone boundary point is selected as a selected zone boundary point in step 1500, and steps 1502, 1504, 1600 and 1508 are repeated.

Figure 17:
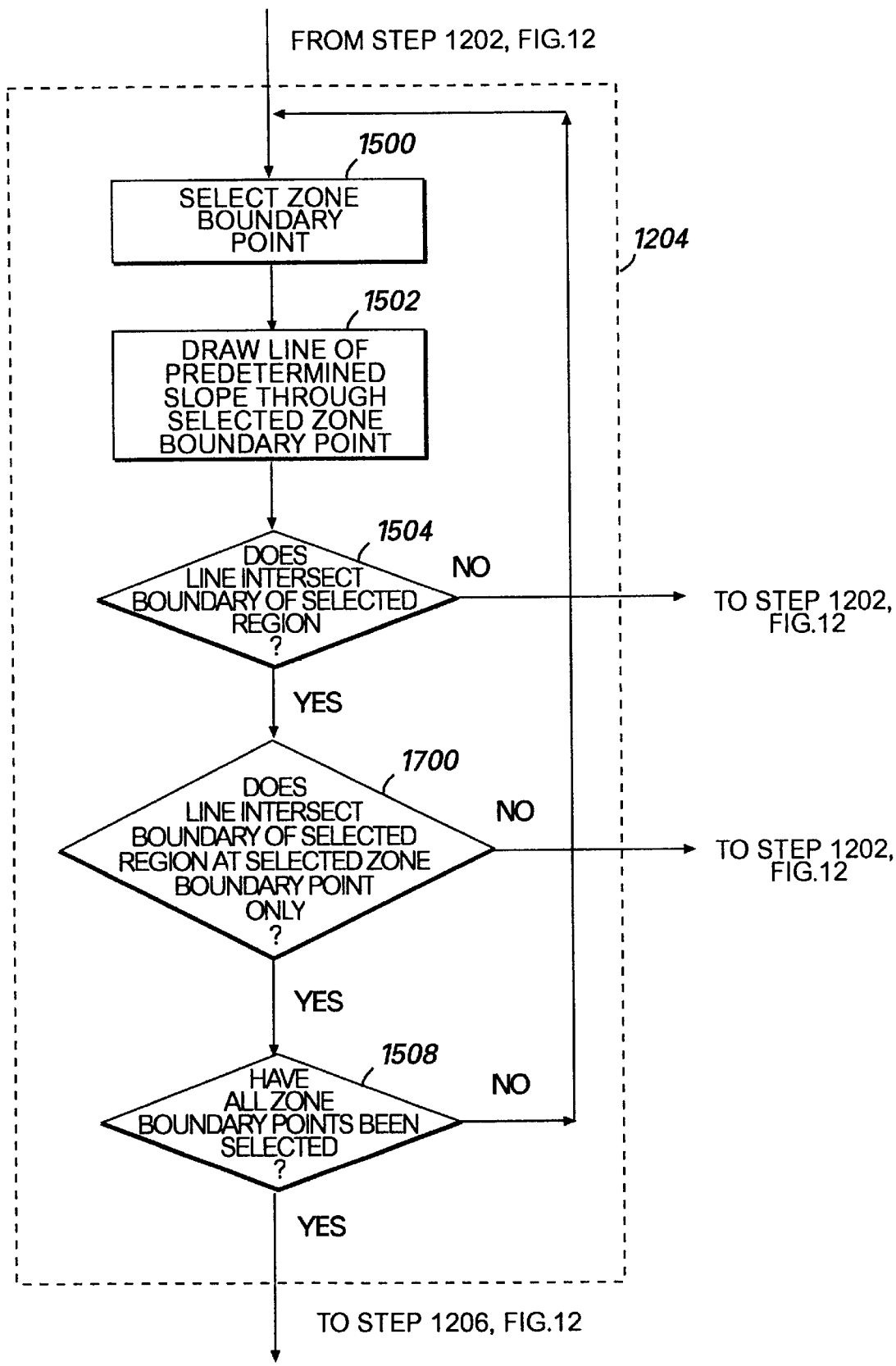
FIG. 17 is a flow diagram illustrating one of the preferred methods for determining whether a zone boundary point is located within a selected region.

FIG. 17 illustrates a variation of step 1204 for the Single Boundary Point Method and the Single Boundary Point Method Using Estimated Geographic Regions. As before, a zone boundary point is selected as a selected zone boundary point in step 1500. Then, in step 1502, a line of predetermined slope is drawn through the selected zone boundary point. A determination is made as to whether the line of predetermined slope intersects the boundary of the selected region in step 1504. If the line does not intersect the boundary of the selected region, then another geographic region is selected in step 1202 and steps 1500, 1502 and 1504 are repeated. These steps are repeated until the line intersects the boundary of the selected region. If the line intersects the boundary of the selected region, then in step 1700, a determination is made as to whether the line intersects the boundary of the selected region only at the selected zone boundary point. If the line intersects the boundary of the selected region only at the selected zone boundary point, then the selected zone boundary point is located within the selected region. If the line does not intersect the boundary of the selected region only at the selected zone boundary point, then steps 1202, 1500, 1502, 1504 and 1700 are repeated until the selected zone boundary point is located within the selected region. If the selected zone boundary point is located within the selected region, then in step 1508 a determination is made as to whether all of the zone boundary points have been selected. If all of the zone boundary points have been selected, then the method proceeds to step 1206. If all of the zone boundary points have not been selected, then another zone boundary point is selected as the selected zone boundary point in step 1500, and steps 1502, 1504, 1700 and are repeated.

What is claimed is:

1. In a coordinate system having a plurality of points, each point defined by an x-coordinate and a y-coordinate, a method for identifying which of a plurality of non-overlapping regions of an area contains a zone, the zone being defined by a plurality of zone boundary points, comprising the steps of:

A. selecting one of the plurality of zone boundary points as a selected zone boundary point;

B. selecting one of the plurality of regions as a selected region, the selected region being defined by a plurality of region boundary points;

C. determining whether the selected zone boundary point is located within the selected region by:

(1) determining whether a straight line drawn through the selected zone boundary point intersects the selected region at a first boundary point and a second boundary point;

(2) if the straight line intersects the selected region at the first boundary point and the second boundary point, then determining whether the selected zone boundary point is located between the first boundary point and the second boundary point; and (3) if the selected zone boundary point is located between the first boundary point and the second boundary point, then determining that the selected zone boundary point is located within the selected region; and D. repeating step C with another one of the plurality of zone boundary points as the selected zone boundary point.

2. The method of claim 1, wherein the straight line is a non-vertical line, and wherein step C(1) comprises the steps of:

(a) building a table of region boundary sides having a plurality of entries, each of the entries having a first region boundary point and a next consecutive region boundary point;

(b) comparing the selected zone boundary point to a selected one of the entries;

(c) if the y-coordinate for the selected first region boundary point is greater than the y-coordinate for the selected zone boundary point and the y-coordinate for the selected next consecutive region boundary point is less than the y-coordinate for the selected zone boundary point, then determining that the straight line intersects the selected region at the first boundary point; and (d) if the straight line intersects the selected region at the first boundary point, then determining the x-coordinate of the first boundary point using the x-coordinate and the y-coordinate of the selected first region boundary point, the x-coordinate and the y-coordinate of the selected next consecutive region boundary point, and the y-coordinate of the selected zone boundary point.

3. The method of claim 2, wherein the steps (b)–(d) are repeated for the second boundary point.

4. The method of claim 2, further comprising the step of:

if the y-coordinate for the selected first region boundary point is not greater than the y-coordinate for the selected zone boundary point or the y-coordinate for the selected next consecutive region boundary is not less than the y-coordinate for the selected zone boundary point, then repeating steps (b)–(d) with a second selected one of the entries.

5. The method of claim 2, wherein step C(2) comprises:

(a) building a table of intersection points having a first entry comprising an odd intersection label and the first boundary point and a second entry comprising an even intersection label and the second boundary point;

(b) comparing the selected zone boundary point to the first entry and the second entry; and (c) if the x-coordinate of the selected zone boundary point is located between the x-coordinate of the first boundary point and the x-coordinate of the second boundary point, then determining that the selected zone boundary point is located between the first boundary point and the second boundary point.

6. The method of claim 1, wherein the straight line is a vertical line, and wherein step C(1) comprises the steps of:

(a) building a table of region boundary sides having a plurality of entries, each of the entries having a first region boundary point and a next consecutive region boundary point;

(b) comparing the selected zone boundary point to a selected one of the entries;

(c) if the x-coordinate for the selected first region boundary point is greater than the x-coordinate for the selected zone boundary point and the x-coordinate for the selected next consecutive region boundary point is less than the x-coordinate for the selected zone boundary point, then determining that the vertical line intersects the selected region at the first boundary point; and (d) determining the y-coordinate of the first boundary point using the x-coordinate and the y-coordinate of the selected first region boundary point, the x-coordinate and the y-coordinate of the selected next consecutive region boundary point, and the x-coordinate of the selected zone boundary point.

7. The method of claim 6, wherein the steps (b)–(d) are repeated for the second boundary point.

8. The method of claim 6, wherein step C(2) comprises:

(a) building a table of intersection points having a first entry comprising an odd intersection label and the first boundary point and a second entry comprising an even intersection label and the second boundary point;

(b) comparing the selected zone boundary point to the first entry and the second entry; and (c) if the y-coordinate of the selected zone boundary point is located between the first entry and the second entry, then determining that the selected zone boundary point is located between the first boundary point and the second boundary point.

9. In a coordinate system having a plurality of points, each point defined by an x-coordinate and a y-coordinate, a method for identifying which of a plurality of non-overlapping regions of an area contains a zone, the zone being defined by a plurality of zone boundary points, comprising the steps of:

A. selecting one of the plurality of zone boundary points as a selected zone boundary point;

B. selecting one of the plurality of regions as a selected region, the selected region being defined by a plurality of region boundary points;

C. determining whether the selected zone boundary point is located within the selected region by:

(1) determining whether a straight line drawn through the selected zone boundary point intersects the selected region only at the selected zone boundary point; and (2) if the straight line intersects the selected region only at the selected zone boundary point, then determining that the selected zone boundary point is located within the selected region; and D. determining whether a second selected zone boundary point is located within the selected region.

10. The method of claim 9, wherein step C(1) comprises the steps of:

(a) building a table of region boundary sides having a plurality of entries, each of the entries having a first region boundary point and a next consecutive region boundary point;

(b) comparing the selected zone boundary point to a selected one of the entries; and (c) if the y-coordinate of the selected first region boundary point is equal to the y-coordinate of the selected zone boundary point and the x-coordinate of the selected first region boundary point is equal to the x-coordinate of the selected zone boundary point, then determining that the straight line intersects the selected region at the selected first region boundary point.

11. The method of claim 10, further comprising the steps of:

(d) building a table of intersection points having a first entry comprising an odd intersection label and the selected first region boundary point;

(e) if the straight line is tangential to the selected first region boundary point and the straight line does not intersect an immediately adjacent region boundary point, then creating a second entry in the table of intersection points comprising an even intersection label and the selected first region boundary point;

(f) comparing the selected zone boundary point to the first entry and the second entry; and (g) if the x-coordinate and the y-coordinate of the selected zone boundary point is equal to the x-coordinate and the y-coordinate of the first entry and the second entry, then determining that the straight line intersects the selected region only at the selected zone boundary point.

12. In a geographic area divided into a plurality of non-overlapping geographic regions, each of the geographic regions being defined by a region boundary of a plurality of region boundary points, and a plurality of non-overlapping geographic zones, each of the geographic zones being defined by a zone boundary of a plurality of zone boundary points, a method for identifying the geographic region which contains a geographic zone, comprising the steps of:

A. estimating the geographic zone with an estimated zone;

B. selecting one of the plurality of non-overlapping geographic regions as a selected region;

C. estimating the selected region with a selected estimated region;

D. making a first determination as to whether the estimated zone is located within the selected estimated region;

E. if the estimated zone is located within the selected estimated region, selecting one of the plurality of zone boundary points of the geographic zone as a selected zone boundary point;

F. making a second determination as to whether the selected zone boundary point is located within the selected region;

G. if the second determination in step F is that the selected zone boundary point is located within the selected region, then repeating step F with another one of the plurality of zone boundary points as the selected zone boundary point; and H. if at least a predetermined percentage of the plurality of zone boundary points is located within the selected region, then identifying the selected region.

13. The method of claim 12, wherein if the first determination in step D is that the estimated zone is not located within the selected estimated region, then repeating steps B, C and D with another one of the non-overlapping geographic regions until the first determination in the step D is that the estimated zone is located within the selected estimated region.

14. The method of claim 12, wherein if the second determination in step F is that the selected zone boundary point is not located within the selected region, then repeating steps B, C, D, E and F with another one of the non-overlapping geographic regions until the second determination in step F is that the selected zone boundary point is located within the selected region.

15. The method of claim 12, wherein step F comprises the steps of:
   (1) determining whether a straight line drawn through the selected zone boundary point intersects the selected region at a first boundary point and a second boundary point;
   (2) if the straight line intersects the selected region at the first boundary point and the second boundary point, then determining whether the selected zone boundary point is located between the first boundary point and the second boundary point; and
   (3) if the selected zone boundary point is located between the first boundary point and the second boundary point, then determining that the selected zone boundary point is located within the selected region.

16. The method of claim 15, wherein the straight line is a non-vertical line, and wherein the step (1) comprises the steps of:
   (a) building a table of region boundary sides having a plurality of entries, each of the entries having a first region boundary point and a next consecutive region boundary point;
   (b) comparing the selected zone boundary point to a selected one of the entries;
   (c) if the y-coordinate for the selected first region boundary point is greater than the y-coordinate for the selected zone boundary point and the y-coordinate for the selected next consecutive region boundary point is less than the y-coordinate for the selected zone boundary point, then determining that the straight line intersects the selected region at the first boundary point; and
   (d) if the straight line intersects the selected region at the first boundary point, then determining the x-coordinate of the first boundary point using the x-coordinate and the y-coordinate of the selected first region boundary point, the x-coordinate and the y-coordinate of the selected next consecutive region boundary point, and the y-coordinate of the selected zone boundary point.

17. The method of claim 16, wherein steps (b)–(d) are repeated for the second boundary point.

18. The method of claim 15, wherein the straight line is a non-vertical line, and wherein the step (1) comprises the steps of:
   (a) building a table of region boundary sides having a plurality of entries, each of the entries having a first region boundary point and a next consecutive region boundary point;
   (b) comparing the selected zone boundary point to a selected one of the entries;
   (c) if the x-coordinate for the selected first region boundary point is greater than the x-coordinate for the selected zone boundary point and the x-coordinate for the selected next consecutive region boundary point is less than the x-coordinate for the selected zone boundary point, then determining that the straight line intersects the selected region at the first boundary point; and
   (d) if the straight line intersects the selected region at the first boundary point, then determining the y-coordinate of the first boundary point using the x-coordinate and the y-coordinate of the selected first region boundary point, the x-coordinate and the y-coordinate of the selected next consecutive region boundary point, and the x-coordinate of the selected zone boundary point.

19. The method of claim 15, wherein the step (2) comprises:
   (a) building a table of intersection points having a first entry comprising an odd intersection label and the first boundary point and a second entry comprising an even intersection label and the second boundary point;
   (b) comparing the selected zone boundary point to the first entry and the second entry; and
   (c) if the x-coordinate of the selected zone boundary point is located between the x-coordinate of the first boundary point and the x-coordinate of the second boundary point, then determining that the selected zone boundary point is located between the first boundary point and the second boundary point.

20. The method of claim 12, wherein step F comprises the steps of:
   (1) determining whether a straight line drawn through the selected zone boundary point intersects the selected region only at the selected zone boundary point; and
   (2) if the straight line intersects the selected region only at the selected zone boundary point, then determining that the selected zone boundary point is located within the selected region.

21. The method of claim 20, wherein step (1) comprises the steps of:
   (a) building a table of region boundary sides having a plurality of entries, each of the entries having a first region boundary point and a next consecutive region boundary point;
   (b) comparing the selected zone boundary point to a selected one of the entries; and
   (c) if the y-coordinate of the selected first region boundary point is equal to the y-coordinate of the selected zone boundary point and the x-coordinate of the selected first region boundary point is equal to the x-coordinate of the selected zone boundary point, then determining that the straight line intersects the selected region at the selected first region boundary point.

22. The method of claim 21, further comprising the steps of:
   (d) building a table of intersection points having a first entry comprising an odd intersection label and the selected first region boundary point;
   (e) if the straight line is tangential to the selected first region boundary point and the straight line does not intersect an immediately adjacent region boundary point, then creating a second entry in the table of intersection points comprising an even intersection label and the selected first region boundary point;
   (f) comparing the selected zone boundary point to the first entry and the second entry; and
   (g) if the x-coordinate and the y-coordinate of the selected zone boundary point is equal to the x-coordinate and the y-coordinate of the first entry and the second entry, then determining that the straight line intersects the selected region only at the selected zone boundary point.

* * * * *